United States Patent
O'Mahony et al.

(10) Patent No.: US 10,516,768 B2
(45) Date of Patent: Dec. 24, 2019

(54) METHODS AND SYSTEMS FOR SWITCHING VEHICLE DATA TRANSMISSION MODES BASED ON DETECTING A TRIGGER AND A REQUEST FOR A VEHICLE DATA MESSAGE

(71) Applicant: Snap-on Incorporated, Kenosha, WI (US)

(72) Inventors: Patrick O'Mahony, San Jose, CA (US); R. Steven Brozovich, Campbell, CA (US); Stephen P. Ward, Blarney (IE)

(73) Assignee: Snap-on Incorporated, Kenosha, WI (US)

( * ) Notice: Subject to any disclaimer, the term of this patent is extended or adjusted under 35 U.S.C. 154(b) by 223 days.

(21) Appl. No.: 14/938,638

(22) Filed: Nov. 11, 2015

(65) Prior Publication Data

US 2017/0134537 A1     May 11, 2017

(51) Int. Cl.
*H04L 29/06*     (2006.01)
*G07C 5/00*     (2006.01)
(Continued)

(52) U.S. Cl.
CPC .............. *H04L 69/18* (2013.01); *G07C 5/008* (2013.01); *G08G 1/052* (2013.01); *H04L 1/0002* (2013.01);
(Continued)

(58) Field of Classification Search
CPC .. G07C 2205/02; G07C 5/008; G07C 5/0816; G07C 5/085; G07C 5/0858; G08G 1/052;
(Continued)

(56) References Cited

U.S. PATENT DOCUMENTS 7,363,129 B1    4/2008  Barnicle et al.
7,734,390 B2    6/2010  Chen
(Continued)

FOREIGN PATENT DOCUMENTS

EP      2521319 A1     11/2012
EP      2728805 A2      7/2014
WO   2013/184832 A2    12/2013

OTHER PUBLICATIONS

International Searching Authority, Invitation to pay additional fees and, where applicable, protest fees with respect to international application No. PCT/US2016/061228, dated Feb. 10, 2017, 7 pages.
(Continued)

*Primary Examiner* — James J Yang
*Assistant Examiner* — Kevin Lau
(74) *Attorney, Agent, or Firm* — McDonnell Boehnen Hulbert & Berghoff LLP

(57) ABSTRACT

A vehicle interface device (VID) switches to a first vehicle data transmission mode (VDTM) from a prior VDTM based on a trigger for transmitting vehicle data messages (VDMs) and which VDMs have been requested at a vehicle data receptor (VDR). A decreased data transfer rate may result from selecting the first VDTM such that some portions of VDMs received while the VID is operating in the other VDTM are transmitted to the VDR from the VID and other portions of those VDMs are not transmitted to the VDR from the VID. An increased data transfer rate may result from selecting the first VDTM such that some portions of VDMs received while the VID is operating in the first VDTM are transmitted to the VDR from the VID whereas those same portions would not have been transmitted to the VDR from the VID if the VID was still operating in the prior VDTM.

27 Claims, 7 Drawing Sheets

(51) Int. Cl.
 *G08G 1/052* (2006.01)
 *H04L 12/26* (2006.01)
 *H04L 29/08* (2006.01)
 *H04L 1/00* (2006.01)

(52) U.S. Cl.
 CPC .......... *H04L 43/0888* (2013.01); *H04L 67/12* (2013.01); *G07C 2205/02* (2013.01); *Y02D 50/10* (2018.01)

(58) Field of Classification Search
 CPC ... H04L 1/0002; H04L 43/0888; H04L 67/12; H04L 69/18
 See application file for complete search history.

(56) References Cited

U.S. PATENT DOCUMENTS

| | | | |
|---|---|---|---|
| 7,953,530 | B1 | 5/2011 | Pederson et al. |
| 8,630,765 | B2 | 1/2014 | Chen |
| 8,656,062 | B2 | 2/2014 | Krzystofczyk et al. |
| 8,750,832 | B2 | 6/2014 | Wuergler et al. |
| 9,342,934 | B2 | 5/2016 | Chen |
| 2002/0007237 | A1 | 1/2002 | Phung et al. |
| 2004/0172177 | A1 | 9/2004 | Nagai et al. |
| 2006/0030981 | A1 | 2/2006 | Robb et al. |
| 2006/0171410 | A1 | 8/2006 | Jung et al. |
| 2007/0038352 | A1* | 2/2007 | Larschan ............... G06Q 10/06 701/33.4 |
| 2009/0259358 | A1 | 10/2009 | Andreasen |
| 2011/0035094 | A1 | 2/2011 | Van Den Berg et al. |
| 2011/0173598 | A1 | 7/2011 | Cassapakis et al. |
| 2012/0044052 | A1 | 2/2012 | Davis et al. |
| 2012/0044086 | A1 | 2/2012 | Ruther et al. |
| 2012/0046807 | A1 | 2/2012 | Ruther et al. |
| 2012/0046825 | A1 | 2/2012 | Ruther et al. |
| 2012/0046826 | A1 | 2/2012 | Panko |
| 2012/0047291 | A1 | 2/2012 | Davis et al. |
| 2012/0096477 | A1 | 4/2012 | Lee et al. |
| 2012/0215491 | A1 | 8/2012 | Theriot et al. |
| 2012/0252364 | A1 | 10/2012 | Inabathuni et al. |
| 2013/0231826 | A1 | 9/2013 | Zhang et al. |
| 2013/0246135 | A1 | 9/2013 | Wang |
| 2013/0304278 | A1 | 11/2013 | Chen |
| 2014/0011483 | A1 | 1/2014 | Baumert et al. |
| 2014/0019000 | A1 | 1/2014 | Ruther et al. |
| 2014/0071995 | A1* | 3/2014 | Hartwich ............... H04L 1/0002 370/468 |
| 2015/0112542 | A1* | 4/2015 | Fuglewicz ........... G07C 5/0858 701/32.2 |
| 2015/0121275 | A1 | 4/2015 | Marshall et al. |
| 2015/0358329 | A1* | 12/2015 | Noda ..................... G06F 21/57 726/4 |
| 2016/0355198 | A1* | 12/2016 | Dulmage ............... H04L 69/18 |
| 2017/0048080 | A1* | 2/2017 | Grimm ............. H04L 12/40032 |

OTHER PUBLICATIONS

International Search Report, International Application No. PCT/US2016/061228, dated May 24, 2017 (7 pages).
Written Opinion of the International Searching Authority, International Application No. PCT/US2016/061228, dated May 24, 2017 (14 pages).
SAE Vehicle Electrical and Electronics Diagnostic Systems Standards Committee and ISO/TC 22/SC3/WG 1 Serial Data Communication Work Group, SAE International Surface Vehicle Standard, (R) E/E Diagnostic Test Modes—Equivalent to ISO/DIS 15031-5: Apr. 30, 2002. 159 pages.
Actron Manufacturing Co., KAL Equip OBD II System Tester 9615 manual, Nov. 5, 2001, 48 pages.
Walter, Rick, P.E., HEM Data Corporation, PEMS Conference, presentation, Acquiring & Analyzing Data from Sensors and In-Vehicle Networks; May 1-2, 2014, Troy, Michigan, 55 pages.
Society of Automotive Engineers; Class B Data Communications Network Interface J1850, May 2001, 24 pages.
B&B Electronics OBDII Streamer Command & Response 2513m V2.11, Mar. 19, 2013, 50 pages.
Delphi Packard Electric Systems, Delphi Packard Electric Systems Connection System Catalog, Metri-Pack Series OBDII, 150 Device Connections, On Board Diagnostic Connection System, pp. 72-73, Jul. 31, 2003.
Snap-On Incorporated, Global OBD Vehicle Communications Software Manual, EAZ0025B43C Rev. A, Aug. 2013, 45 pages.
Vetronix Corporation, Consult-II Operator's Manual, Mar. 1999, 38 pages.
Nissan Data Scan, L.L.C., Nissan Data Scan II User Manual, 2004, Rev. 1, Jan. 8, 2013, 79 pages.
Microsoft Corporation, Use freely ELM327, downloaded from the World Wide Web on Apr. 12, 2014, 2 pages.
Microsoft Corporation, OBD 2 Codes, downloaded from the World Wide Web on Apr. 12, 2014, 2 pages.
Microsoft Corporation, Diagnose your car, downloaded from the World Wide Web on Apr. 12, 2014, 3 pages.
Auterra, LLC, DashDyno SPD Automotive Computer, Feb. 21, 2011, http://www.auterraweb.com/ (1 page).
Jain, A.K., et al., Data Clustering: A Review, ACM Computing Surveys, vol. 31, No. 3, Sep. 1999, pp. 264-323 (60 pages).
Seyfert, Karl, OBD II Generic PID Diagnosis, Motor Magazine, Sep. 2007, Troy Michigan (7 pages).
Seyfert, Karl, "OBD II includes many helpful diagnostic trouble codes, designed to identify the possible causes of hundreds of potential system faults. But can it correctly identify a loose nut behind the wheel?", Motor Magazine, Oct. 2015, Troy, Michigan, pp. 4 and 6 (2 pages).
Seyfert, Karl, "OBD II's self-diagnostic capabilities have been a real boon to repair on many vehicles. But the systems on some early vehicles can really throw you a curve.", Motor Magazine, Jun. 2005, Troy, Michigan, pp. 6 and 8 (2 pages).
Müller, Tobias Carsten, et al., A Heuristic Approach for Offboard-Diagnostics in Advanced Automotive Systems, SAE World Congress 2009, Apr. 20, 2009, Detroit, MI, SAE Doc. No. 2009-01-1027 (9 pages).
Sankavaram, Chaitanya, et al., Event-driven Data Mining Techniques for Automotive Fault Diagnosis, 21st International Workshop on Principles of Diagnosis, Oct. 13-16, 2010, pp. 1-8 (8 pages).
Singh, Satnam, et al., Data-Driven Framework for Detecting Anomalies in Field Failure Data, Aerospace Conference, 2011 IEEE, updated Jan. 3, 2011, pp. 1-14 (14 pages).
Zhang, Yilu, et al., Remote Vehicle State of Health Monitoring and its Application to Vehicle No-Start Prediction, AUTEST 2009, Anaheim, CA, Sep. 2009, IEEE, pp. 88-93 (6 pages).
Texas Instruments Incorporated, Application Report, Introduction to the Controller Area Network (CAN), SLOA101B, Aug. 2002—Revised May 2016.

\* cited by examiner

METHODS AND SYSTEMS FOR SWITCHING VEHICLE DATA TRANSMISSION MODES BASED ON DETECTING A TRIGGER AND A REQUEST FOR A VEHICLE DATA MESSAGE

BACKGROUND

A vehicle scanner device may request serial data from a vehicle and receive the serial data from the vehicle in response to the request. The vehicle scanner device may establish a wireless communication link with a display device and transmit the received serial data to the display device over the wireless communication link for displaying the serial data at the display device. A bandwidth of the wireless communication link may be defined as one or more of a width of the communication link and a capacity to move data through the communication link. The wireless communication link may have one or more communication channels. The width of the communication link may be defined as a frequency range or band.

A variety of factors may influence a rate at which the communication link transfers the serial data from the vehicle scanner device to the display device. Changes in that transfer rate may impact how the display device displays the serial data received from the vehicle.

OVERVIEW

Described herein are one or more example embodiments that pertain to a device configured with multiple vehicle data transmission modes (VDTM) and an ability to switch between two different VDTM. For example, a device connectable to a vehicle, such as a vehicle interface device (VID), may be configured with multiple VDTM. The VID may be configured to determine which particular VDTM of the multiple VDTM is to be used at any particular time based on one or more conditions associated with the VID. The VID may be configured to select the particular VDTM and to switch its operation to the particular VDTM. The VID may establish a communication link for transmitting vehicle data messages received from the vehicle to another device, such as a vehicle data receptor (VDR). The communication link may have a maximum data transfer rate for transmitting vehicle data messages to the VDR and that data transfer rate may decrease for various reasons, such as, but not limited to, an increase in interference with the communication link, an increase in distance between the VID and the VDR, and changing communication channels (e.g., a high bandwidth communication channel to a low bandwidth communication channel). When operating below the maximum data transfer rate, the data transfer rate across the communication link may increase from the present data transfer rate until the maximum data transfer rate is obtained. The communication link may be a wireless communication link, a wired communication link, or a combination of a wireless communication and wired communication links.

In one respect, an example embodiment may take the form of a method comprising: (i) receiving, at a first device, multiple instances of vehicle data messages, wherein each vehicle data message includes a data identifier and a data value, (ii) detecting, by a processor of the first device, a first trigger to change a VDTM for transmitting vehicle data messages over a communication link from the first device to a second device, (iii) determining, by the processor, a first VDTM based on the first trigger and one or more requests for the vehicle data messages, (iv) switching, by the first device, from operating in a prior VDTM to the first VDTM, and (v) transmitting, over the communication link from the first device to the second device according to the first VDTM, at least a portion of the vehicle data messages received while the first device is operating in the first VDTM.

In another respect, an example embodiment may take the form of a system comprising: (i) a service data link connector configured to establish a connection with a vehicle that transmits vehicle data messages, (ii) a first transceiver configured to establish a communication link with a second transceiver, (iii) a processor; and (iv) a computer-readable medium containing computer-readable program instructions that are executable by the processor to perform a set of functions, wherein the set of functions includes: (a) detecting a first trigger to change a VDTM for transmitting vehicle data messages over the communication link, (b) determining a first VDTM based on the first trigger and one or more requests for the vehicle data messages, (c) switching operation of the system from a prior VDTM to the first VDTM, and (d) transmitting, from the first transceiver, at least a portion of the vehicle data messages received from the vehicle while the system operates in the first VDTM.

In yet another respect, an example embodiment may take the form of a system comprising: (a) a service data link connector configured to establish a connection with a vehicle that transmits vehicle data messages, wherein each vehicle data message includes a data identifier and a data value, (b) a first transceiver configured to establish a communication link with a second transceiver, and (c) a processor that is connected to the service data link connector and to the first transceiver, and is programmed to: (i) detect a first trigger to change a VDTM for transmitting vehicle data messages over the communication link, (ii) determine a first VDTM based on the first trigger and one or more requests for the vehicle data messages, (iii) switch operation of the system from a prior VDTM to the first VDTM, and (iv) provide the first transceiver with at least a portion of the vehicle data messages received from the vehicle while the system operates in the first VDTM for transmission to the second transceiver.

Aspects and advantages of these and other described embodiments will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

DETAILED DESCRIPTION

I. Introduction

Figure 1:
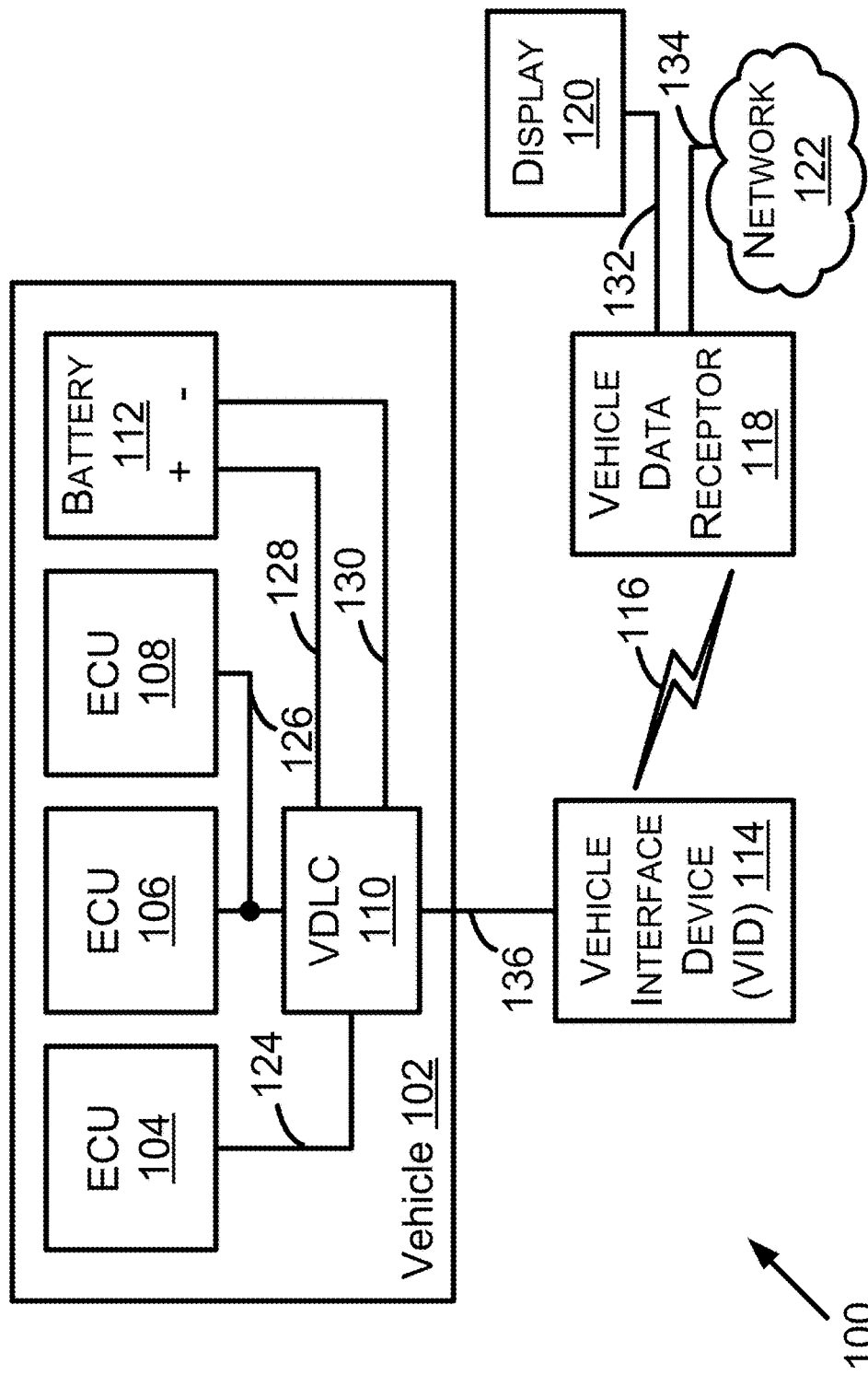
FIG. 1 is a block diagram of a system in accordance with the example embodiments.

This description describes several example embodiments including, but not limited to, embodiments pertaining to a device, such as a VID, that is configured to switch from one VDTM to another VDTM. The VID may determine which VDTM to switch to based, at least in part, on detecting a trigger to change a VDTM for transmitting vehicle data messages over a communication link. The VID may transmit requests for vehicle data messages to a vehicle and receive vehicle data messages from the vehicle in response to the requests. The VID may determine which vehicle data messages, or some portion(s) thereof, that are to be transmitted to another device based on the present VDTM used by the VID when the vehicle data messages are received or when the vehicle data messages are to be transmitted. The VID may also send vehicle data messages that were received at the VID prior to the VID switching to the present VDTM. Transmission of a vehicle data message or a portion thereof from the VID to a VDR or a display device may include transmitting a data value of the vehicle data message to the VDR or the display device with or without the identifier of the vehicle data message.

In this description, the articles "a," "an" or "the" are used to introduce or refer to elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

The block diagrams, flow charts, and other data shown in the figures are provided merely as examples and are not intended to be limiting. Many of the elements illustrated in the figures or described herein are functional elements that may be implemented as discrete or distributed components or in conjunction with other components, and in any suitable combination and location. Those skilled in the art will appreciate that other arrangements and elements (e.g., machines, interfaces, functions, orders, or groupings of functions) may be used instead. Furthermore, various functions described as being performed at one or more elements may be carried out at a processor executing computer-readable program instructions (CRPI) or at any combination of hardware, firmware, or software.

The description includes examples of data values within various messages or within a computer-readable medium. The example data values may include hexadecimal data values. The data values in this description contained within square brackets (i.e., [ ]) represent hexadecimal data values. The example data values may include binary data values and decimal data values. The binary data values are identified as being binary data values. Any described data value not identified as a binary or hexadecimal data value may be considered to be a decimal data value. The example embodiments are not limited to using binary, decimal, and hexadecimal data values.

Either or both of a vehicle data link connector and a service vehicle data link connector may be referred to more simply as a "data link connector" or a "DLC." Moreover a service vehicle data link connector may be referred to a vehicle DLC connector.

II. Example Systems

FIG. 1 is a block diagram of a system 100 in accordance with the example embodiments described herein. The system 100 may include all of the components shown in FIG. 1 or any proper subset of the components shown within the system of FIG. 1. For example, the system 100 may include a vehicle 102 having an electronic control unit (ECU) 104, an ECU 106, an ECU 108, a vehicle data link connector (VDLC) 110, and a battery 112. The VDLC 110 may include or be referred to as an on-board diagnostics (OBD) II connector. An OBD II connector may include slots for retaining up to 16 connector terminals, but the VDLC 110 is not necessarily so limited. A battery power conductor 128 and a chassis ground conductor 130 may connect the battery 112 to the VDLC 110. A device that connects to the VDLC 110 may draw an electric current provided to the VDLC 110 from the battery 112 for operating the device.

A vehicle, such as the vehicle 102 or the vehicle 104, is a mobile machine that may be used to transport a person, people, or cargo. As an example, any vehicle described herein may be driven or otherwise guided along a path (e.g., a paved road or otherwise) on land, in water, or in the air or outer space. As another example, any vehicle described herein may be wheeled, tracked, railed or skied. As yet another example, any vehicle described herein may include an automobile, a motorcycle, a light-duty truck, a medium-duty truck, a heavy-duty truck, a semi-tractor, or a farm machine. As still yet another example, any vehicle described herein may include or use any appropriate voltage or current source, such as a battery, an alternator, a fuel cell, and the like, providing any appropriate current or voltage, such as about 12 volts, about 42 volts, and the like. As still yet another example, any of the vehicles described herein may include or use any desired system or engine. Those systems or engines may include items that use fossil fuels, such as gasoline, natural gas, propane, and the like, electricity, such as that generated by a battery, magneto, fuel cell, solar cell and the like, wind and hybrids or combinations thereof. A vehicle may include one or more vehicle communication links for carrying vehicle data messages throughout the vehicle. Each vehicle communication link (VCL) may include one or more conductors. As shown in FIG. 1, vehicle 102 includes a VCL 124 and a VCL 126. As an example, VCL 124 and VCL 126 may include one or two conductors of a VCL for carrying vehicle data messages in accordance with a vehicle data message (VDM) protocol. The VDM protocol corresponding to any VCL within the vehicle 102 may include, but is not limited to, a Society of Automotive Engineers (SAE) J1850 (pulse width modulated (PWM) or variable pulse width (VPW)) VDM protocol, an International Organization for Standardization (ISO) 15764-4 controller area network (CAN) VDM protocol, an ISO 9141-2 K-Line VDM protocol, or an ISO 14230-4 KWP2000 K-Line VDM protocol.

The VDLC 110 may include conductor terminals that connect to a conductor in the vehicle 102. For instance, the VDLC 110 may include a connector terminal connected to a conductor 128 that connects to a positive terminal of the battery 112 and a conductor 130 that connectors to a negative terminal of the battery 112.

The ECU 104, the ECU 106, and the ECU 108 may control various aspects of vehicle operation or components within the vehicle 102. For example, the ECU 104, the ECU 106, and the ECU 108 may include a powertrain system ECU, an engine ECU, a supplemental inflatable restraint (SIR) system (i.e., an air bag system) ECU, an entertainment system ECU, or some other ECU. The ECU 104, the ECU 106, and the ECU 108 may receive inputs (e.g., a sensor input), control output devices (e.g., a solenoid), generate a vehicle data message (such as a VDM based on a received input or a controlled output), and detect a fault or failure condition within the vehicle 102 and set a diagnostic trouble code (DTC) as being active or history. Two or more ECU, such as the ECU 106 and the ECU 108, may send a VDM to each other and receive a VDM from the other ECU(s). Transmission of those VDM may occur over a VCL, such as VCL 126.

The system 100 also includes a vehicle interface device (VID) 114, a vehicle data receptor device 118 (or more simply, "vehicle data receptor" or "VDR"), a display 120, and a network 122. A communication link 132 may connect the VDR 118 and the display 120. A communication link 134 may connect the VDR 118 and the network 122. The network 122 may include one or more of the communication links 132 and 134. The display 120 may include a computer monitor, a display of a tablet device, a display of a smart phone or some other type of display. The display 120 may be configured to display any data described herein as being displayed or displayable at a VDR. As an example, any display or display device described herein may include or be configured as (i) a capacitive touchscreen display, (ii) a resistive touchscreen display, (iii) a plasma display, (iv) a light emitting diode (LED) display, (v) as a cathode ray tube display, (vi) an organic light-emitting diode (OLED) display, such as an active-matrix OLED or a passive-matrix OLED, (vii) a touch-screen display such as a color touch screen used on a MODIS™ ultra integrated diagnostic system (reference number EEMS328 W) available from Snap-on Incorporated of Kenosha, Wis., (viii) a backlit color liquid crystal display (LCD) having a resistive touch screen or panel, or (ix) some other display.

The network 122 may include a local area network (LAN) within a vehicle repair shop, the Internet, or some other type of network. The network 122 may include a wireless network, a wired network, or a combination of a wireless network and a wired network.

The VID 114 may be configured to establish a connection to the vehicle 102 and to the VDR 118. That connection to the VDR 118 may include a communication link 116. The communication link 116 may include a wireless communication link, a wired communication link, or a combination of a wireless communication link and a wired communication link. A gateway or access point may be used to link a wireless communication link and a wired communication link. The communication link 116 may provide a maximum data transfer rate for transmitting requests for vehicle data messages to the VID 114 and for transmitting vehicle data messages to the VDR 118.

The communication link 116 may carry out communications according to any of a variety of communication protocols or standards. As an example, the communication protocol used by the communication link 116 may be an Institute of Electrical and Electronic Engineers (IEEE) 802.15.1 standard for wireless personal area networks (PANs) or a Bluetooth version 4.1 standard developed at the Bluetooth Special Interest Group (SIG) of Kirkland, Wash. As another example, the communication protocol used by the communication link 116 may be an IEEE 802.11 standard for wireless LANs, which is sometimes referred to as a Wi-Fi standard. As another example, the communication protocol used by the communication link 116 may be a cellular phone standard, such as standard for 3G or 4G cellular phone communications. As yet another example, the communication protocol used by the communication link 116 may include an IEEE 802.3 Ethernet standard. Other examples of the communication standards or protocols used by the communication link 116 are also possible.

The VDR 118 may transmit requests for vehicle data messages to the VID 114 over the communication link 116. The VID 114 may transmit the received requests for vehicle data messages, or some portion thereof, to the vehicle 102. The VID 114 may receive vehicle data messages in response to the requests for vehicle data messages transmitted to the vehicle 102. The VID 114 may transmit the received vehicle data messages, or some portion thereof, to the VDR 118 over the communication link 116.

FIG. 1 shows a connection 136 that connects the VDLC 110 and the VID 114 together. The connection 136 may include terminals in the VDLC 110 and terminals in the VID 114 that are releasably connectable to each other. The connection 136 may include a wireless communication link established between the VDLC 110 and the VID 114. The connection 136 may include a wired communication link between the VDLC 110 and the VID 114.

Figure 2:
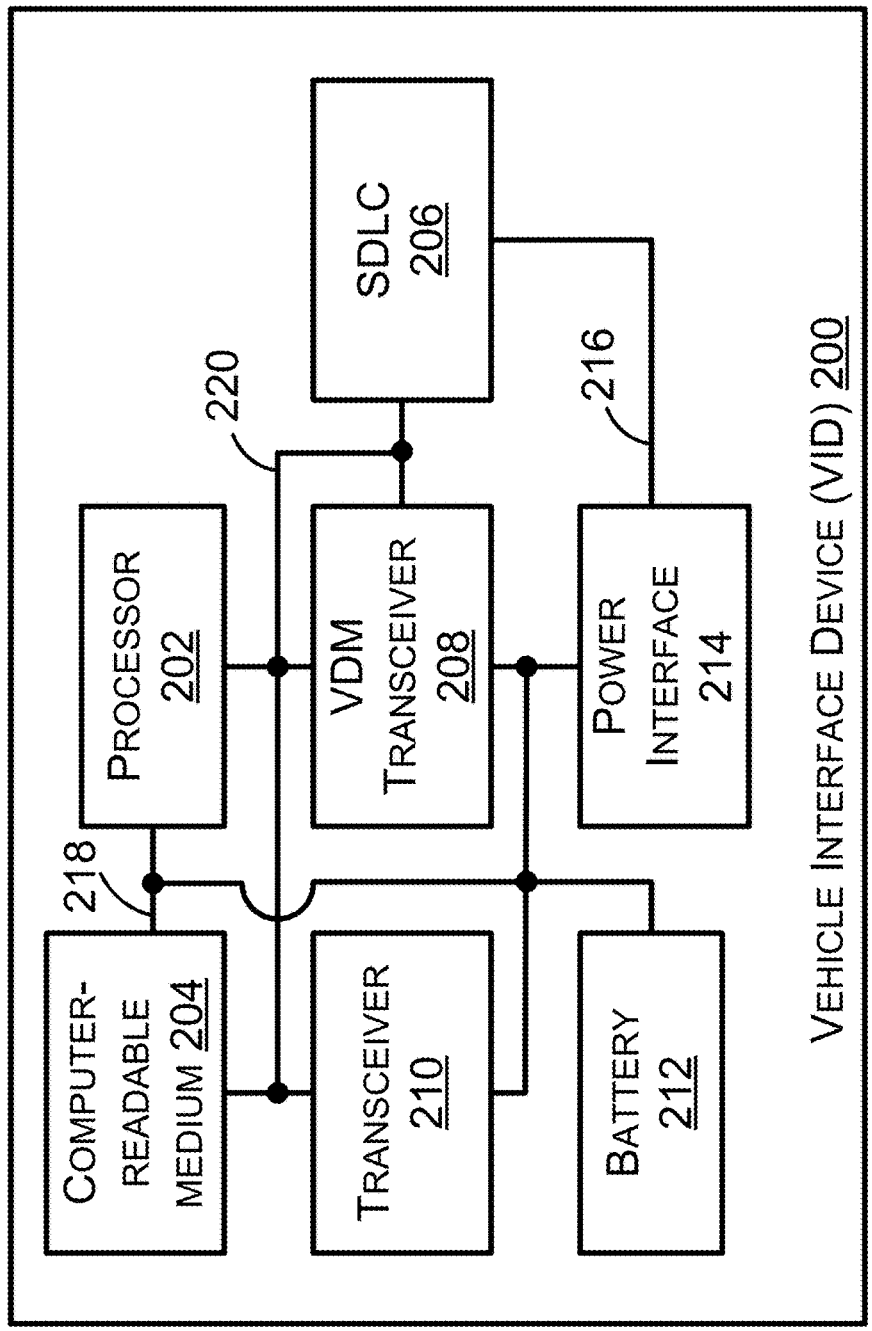
FIG. 2 is a block diagram of a VID in accordance with the example embodiments.

Next, FIG. 2 is a block diagram of a vehicle interface device 200 in accordance with the example embodiments described herein. The VID 200 may operate within the system 100 in place of or in addition to the VID 114. The VID 114 may be arranged like the VID 200, such that the VID 114 operates like the VID 200. The VID 114 may include the VID 200 or any one or more of the components thereof. The VID 200 may operate in the same manner as the VID 114.

The VID 200 may include all of the components shown in FIG. 2 or any proper subset of the components shown within the VID in FIG. 2. For example, the VID 200 may include a processor 202, a computer-readable medium 204, a service data link connector (SDLC) connector 206, a VDM transceiver 208, a transceiver 210, a battery 212, and a power interface 214. One or more of the battery 212 and the power interface 214 may provide an electric current to one or more of the processor 202, the computer-readable medium 204, the VDM transceiver 208, and the transceiver 210 by way of a power bus 218. The VID 200 may include a power bus 216 for providing electric current from the SDLC 206 to the power interface 214. One or more of the power busses 216 and 218 may include an electrical ground circuit.

A person skilled in the art will understand that the VID 200 may be configured with various power source arrangements other than that shown in FIG. 2. For example, the VID 200 may include a power source arrangement that includes the power interface 214, but does not include the battery 212. As another example, the VID 200 may include a power arrangement that includes the battery 212, but does not include the power interface 214. For any power arrangement including the power interface 214, the power interface 214 may include a power cord for connection or transformer for connection of the VID 200 to a typical alternating current (AC) power source (e.g., a 120 volt AC, 60 hertz, power source).

A processor, such as processor 202 or any other processor discussed herein, may include one or more general purpose processors (e.g., INTEL® single core microprocessors or INTEL® multicore microprocessors) or one or more special purpose processors (e.g., digital signal processors). Additionally or alternatively, a processor may include an application specific integrated circuit (ASIC). Processor 202 may be configured to execute computer-readable program instructions, such as the CRPI 222 shown in FIG. 3. Furthermore, any processor described herein may be programmed to perform any function or any combination of functions described herein as being performed by that processor or performed by the device that includes that processor.

A computer-readable medium, such as the computer-readable medium 204 or any other computer-readable medium discussed or shown herein, may include a non-transitory computer-readable medium. A non-transitory computer-readable medium may include volatile or non-volatile storage components, such as optical, magnetic, organic or other memory or disc storage, which may be integrated in whole or in part with a processor, or which may be separate from a processor. A non-transitory computer readable medium may include, but is not limited to, a random-access memory (RAM), a read-only memory (ROM), a programmable read-only memory (PROM), an erasable programmable read-only memory (EPROM), an electrically erasable programmable read-only memory (EEPROM), a compact disk read-only memory (CD-ROM), or any other device that is capable of providing data or executable instructions that may be accessed by a processor, such as processor 202. A computer-readable medium may be referred to by other terms such as, but not limited to, a "computer-readable storage medium," a "data storage device," a "memory device," a "memory," or a "computer-readable data storage device."

Additionally or alternatively, a computer-readable medium may include a transitory computer-readable medium. The transitory computer-readable medium may include, for example, CRPI provided over a communication link, such as a communication link which is connected to or is part of the network 114. The communication link may include a digital or analog communication link. The communication link may include a wired communication link or a wireless communication link. The computer-readable medium may be readable by a processor.

The SDLC 206 may include a connector that provides a releasable connection of the VID 200 to the vehicle 102. In one respect, that releasable connection may be carried out, at least in part, by wired conductors of the connection 136. In that respect, the SDLC 206 may include a connector with terminals that are releasably connectable to terminals within the VDLC 110. As an example, the SDLC 206 may include an OBD II connector that meets the SAE J1962 specification such as the connector 16M, part number 12110252, available from Delphi Automotive LLP of Troy, Mich. In another respect, the releasable connection between the VID 200 and the vehicle 102 may be carried out using a wireless connection of the connection 136. In that respect, the SDLC 206 may include a wireless transceiver to transmit VDM to and receive VDM from a version of the VDLC 110 configured for wireless communication of VDM. The SDLC 206, and one or more of the processor 202, the computer-readable medium 204, the VDM transceiver 208, and the transceiver 210 may connect to a data bus 220 configured for transmission of VDM received from a vehicle.

The VDM transceiver 208 may transmit a VDM for transmission over a vehicle communication link, such as VCL 124 or VCL 126. VDM transceiver 208 may receive a VDM transmitted over a VCL, such as VCL 124 or VCL 126.

The transceiver 210 may include one or more transceivers, such as (i) one or more wired transceivers that transmit and receive communications by way of a wired communication link or network, or (ii) one or more wireless transceiver that transmit and receive communications by way of a wireless communication link or network. A wireless transceiver may include one or more antennas. A wireless transceiver may be configured to carry out wireless communications (i.e., transmitting and receiving of wireless communications) according to one or more wireless communication protocols or standards. As an example, a wireless transceiver may carry out communications according to an IEEE 802.15.1 standard or a Bluetooth version 4.1 standard. As another example, a wireless transceiver may carry out communications according to an IEEE 802.11 standard. As another example, a wireless transceiver may carry out communications according to a cellular phone standard. Other examples of a wireless communication protocol or standard used by a wireless transceiver are also possible.

At least a portion of one or more of the computer-readable medium 204, the VDM transceiver 208, and the transceiver 210, may be included within the processor 202.

The processor 202 may execute computer-readable program instructions so that the VID 200 operates in a particular data acquisition mode. As an example, the VID 200 may operate in a pull data acquisition mode in which the VID 200 requests specific data messages from the vehicle 102. The pull data acquisition mode may be used for instances in which the vehicle 102 communicates vehicle data messages according to an ISO standard 15765 for controller area networks, or some other standard or protocol. Any request for a vehicle data message described herein may include a request for a vehicle data parameter. Any request for a vehicle data parameter may include a data identifier (e.g., a parameter identifier (PID)).

As another example, the VID 200 may operate in a push data acquisition mode in which the VID 200 transmits to the vehicle 102 a request for data parameters to be streamed to the VID 200 and the VID selects the particular data messages that are to be sent to the VDR 118. As an example, the request for data messages may be a request for all data messages for each data identifier provided from a particular ECU in the vehicle 102. As another example the request for data message may be a request for all data messages for each data identifier associated with diagnosing a particular symptom (e.g., a failure mode) on the vehicle 102. The push data acquisition may be used for instances in which the vehicle 102 communicates vehicle data messages according to a diagnostic data link (DDL) protocol (e.g., DDL1 or DDL2) used on vehicles built by Nissan Motor Company Ltd., Nishi-ku, Yokohama, Japan, or some other protocol. The VID 200 may simultaneously operate in both a data acquisition mode and a VDTM.

Figure 3:
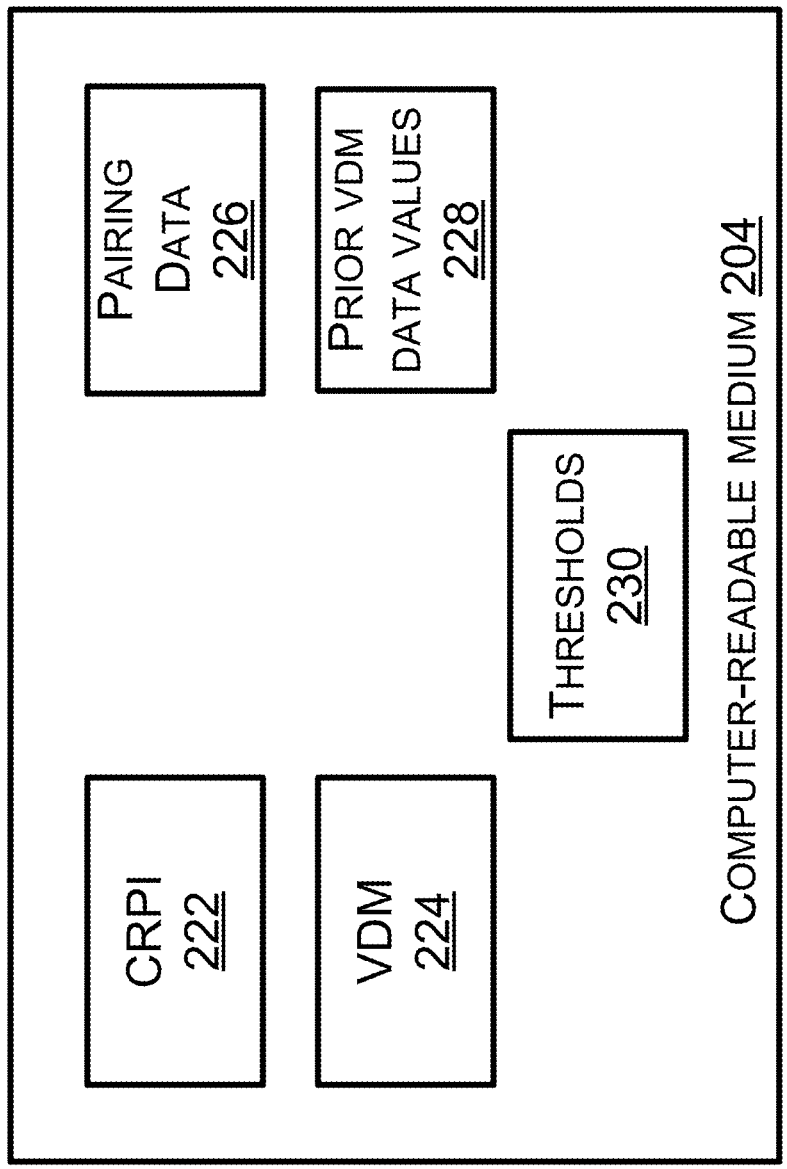
FIG. 3 is a block diagram of a computer-readable medium in accordance with the example embodiments.

FIG. 3 shows example data that may be stored in the computer-readable medium 204. That data may include, but are not limited to, CRPI 222, VDM 224, pairing data 226, prior VDM data values 228, and thresholds 230. The CRPI 222 may include program instructions that are executable by the processor 202 to carry out, at least in part, any of the functions described herein as being performed by the VID 114 or the VID 200 or by any one or more of the components thereof.

The VDM 224 may include the VDM received from one or more vehicles. The VID 200 may delete the VDM received from a prior vehicle that is not presently connected to the VID 200, but the VID 200 is not necessarily so limited. The VID 200 may delete the VDM received from a vehicle presently connected to the VID 200. That deletion can, for example, occur after the transceiver 210 transmits at least a portion of stored VDM to the VDR 118 or after the processor 202 determines that no portion of the VDM is to be sent to the VDR 118.

The pairing data 226 may include a link key associated with another device (e.g., a "second device" described herein, or a VDR), and a link key for any other device that has paired with the VID 200. The link key or any other portion of the pairing data 226 may be used when the VID 200 establishes a wireless communication link with another device.

The prior VDM data values 228 may include data values and corresponding data identifiers of instances of VDM that the VID 200 transmitted to the VDR 118. Examples of the prior VDM data values are shown in, and described with respect to, Table 1 below.

As another example, the prior VDM data values 228 may include multiple data values pertaining to a particular data identifier, and a data value representing an aggregation of the multiple data values. For instance, the multiple data values may include engine RPM data values equal to 750 RPM, 750 RPM, 1,000 RPM, 1,000 RPM, and 1,100 RPM. The aggregation value may equal an average RPM data value equal to 920 RPM.

The prior VDM data values 228 may include some, but not all, of the data values of a VDM received by the VID 114. For instance, a VDM from an ECU for an SIR system may include data values that indicate whether the vehicle brake pedal is being applied, whether an occupant is detected in a passenger seat, and whether one or more seat belts in the vehicle 102 are connected. A prior VDM data value may include data that indicates some but not all of those items of SIR system VDM.

The thresholds 230 may include one or more thresholds for comparing to a VDM data value, which may include comparing the VDM data value to a threshold. A result of such comparison may indicate the VDM data value is less than the threshold, equals the threshold, or exceeds the threshold. Determining a result of such comparison may be used as a trigger to store the compared VDM data value within prior VDM data values 228 or as a trigger to transmit the VDM data value to the VDR 118.

The thresholds 230 may include one or more thresholds pertaining to data transfer rates. A pair of those thresholds pertaining to data transfer rates may define a range of data transfer rates. The processor may determine a data transfer rate for the communication link 116 and compare the determined data transfer rate to the defined ranges of data transfer rates to determine whether a change in data transfer rate for transmitting VDM has occurred. A VDTM may be associated with one or more of the defined ranges of data transfer rates. A VDTM may be selected upon determining that a present data transfer rate is within a range of data transfer rates associated with the selected VDTM. Any one or more other threshold described herein may be stored within the thresholds 230.

Figure 4:
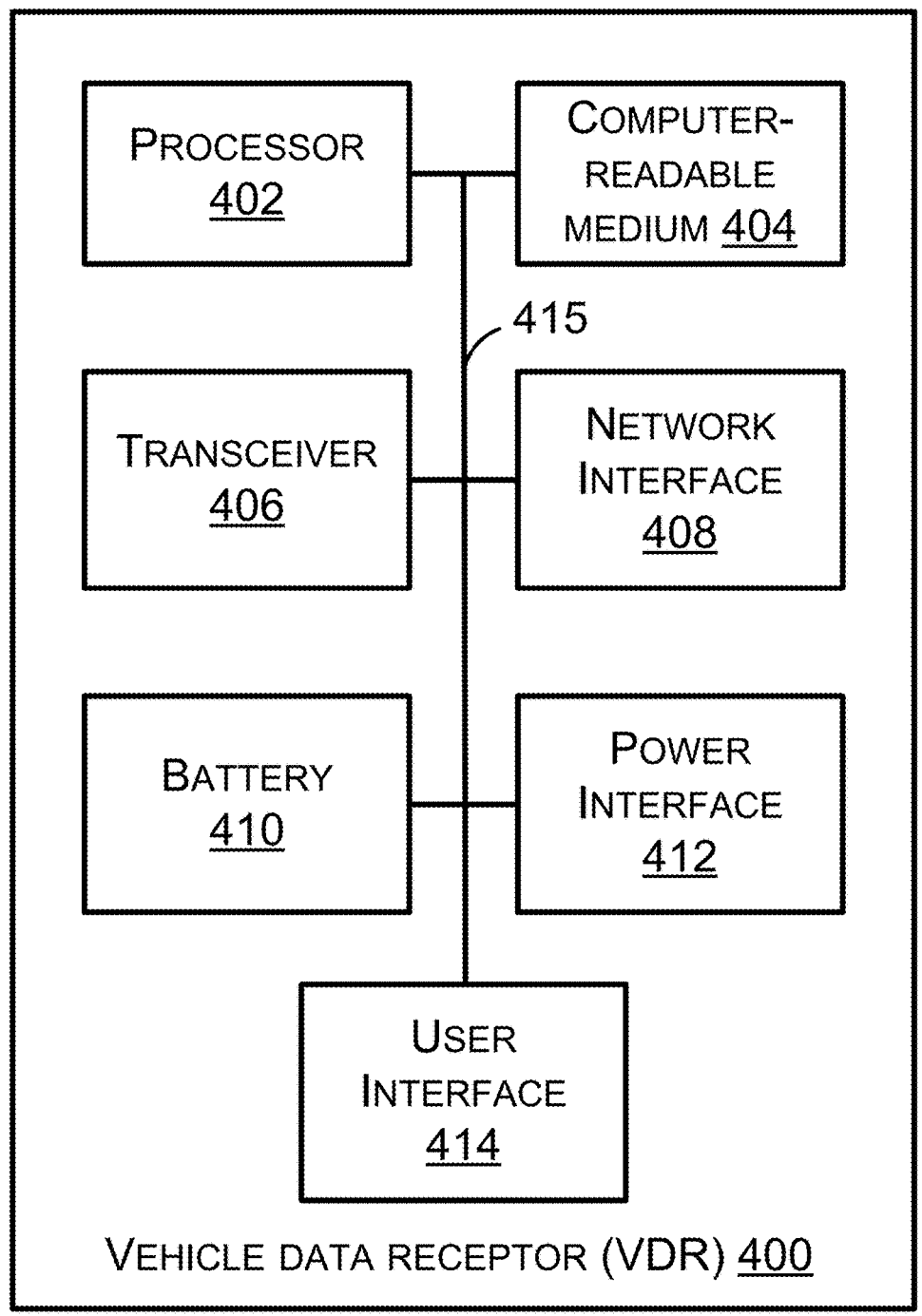
FIG. 4 is a block diagram of a VDR in accordance with the example embodiments.

Next, FIG. 4 is a block diagram of a vehicle data receptor 400 in accordance with the example embodiments described herein. The VDR 400 may operate within the system 100 in place of or in addition to the VDR 118. The VDR 118 may be arranged like the VDR 400, such that the VDR 118 may perform one or more of the functions described herein as being performed by the VDR 400. The VDR 118 may include the VDR 400 or any one or more of the components thereof. The VDR 400 may perform one or more of the functions described herein as being performed by the VDR 118.

The VDR 400 may include all of the components shown in FIG. 4 or any proper subset of the components shown within the VDR in FIG. 4. For example, the VDR 400 may include a processor 402, a computer-readable medium 404, a transceiver 406, a network interface 408, a battery 410, a power interface 412, and a user interface 414, two or more of which may be communicatively coupled or linked together via a system bus, network, or other connection mechanism 415. One or more of the battery 410 and the power interface 412 may provide an electric current to one or more of the processor 402, the computer-readable medium 404, the transceiver 406, the network interface 408, and the user interface 414 by way of a power bus (not shown). The power interface 414 may, but is not limited to, receiving electric current from an alternating current power outlet.

The processor 402 may execute CRPI stored within the computer-readable medium 404 to carry out, at least in part, any of the functions described herein as being performed by the VDR 118 or the VDR 400 or by any one or more of the components thereof. The CRPI within the computer-readable medium 404 may include program instruction to cause a display 416 (shown in FIG. 6) to display any data described herein as being displayed or displayable by the VDR 118 or the VDR 400.

The transceiver 406 may include one or more transceivers, such as (i) one or more wired transceivers that transmit and receive communications by way of a wired communication link or network, or (ii) one or more wireless transceiver that transmit and receive communications by way of a wireless communication link or network. The transceiver 406 may include one or more antennas. The transceiver 406 may be configured to carry out wireless communications according to one or more wireless communication protocols, similar to the transceiver 210. The transceiver 406 may be used to establish a wireless connection with another device, such as the VID 114, the VID 200, or the display 120.

The network interface 408 may interface (e.g., connect to by way of a wired or wireless communication link) to any of a variety of components, communication links, or networks. For example, the network interface 408 may interface to the communication link 132 that is connected to the display 120, which is located remotely from the VDR 400. As an example, the display 120 may display the VDM (or any portion thereof) the VDR 400 receives from the VID 114. As another example, the display 120 may display requests for VDM that the VDR 400 will or has transmitted to the VID 114. As another example, the network interface 408 may interface to a network 122 (e.g., the Internet) by way of the communication link 134. The VDR 400 may transmit the VDM it receives to a computer-readable medium connected to the network 122. That computer-readable medium may include a database of the VDM.

The user interface 414 may include the display 416. The display 416 may display items to guide selection of a VDM to request from the VID 114. The display 416 may display the VDM received from the VID 114. The VDM received from the VID 114 may include only a portion of the VDM that the VID 114 received from the vehicle 102. For instance, the portion of the VDM may include some or all of the data values contained with the VDM.

The user interface 414 may include one or more components (e.g., a touch screen, a mouse, or keyboard) configured for entering data, such as selection of a VDM, into the VDR 400.

One or more of the VDR 118 and the VDR 400 may include, be configured as, or include components of a smart phone (such as an IPHONE® smartphone from Apple Inc. of Cupertino, Calif., or a GALAXY S® smartphone from Samsung Electronics Co., Ltd. Of Maetan-Dong, Yeong-tong-Gu Suwon-Si, Gyeonggi-Do, Republic of Korea), a tablet device (such as an IPAD® tablet device from Apple Inc., or a SAMSUNG GALAXY TAB tablet device from Samsung Electronics Co., Ltd.), or a vehicle diagnostic tool, such as a VERSUS® PRO diagnostic and information system (model number EEMS327 or EEMS327 W) available from Snap-on Incorporated, Kenosha, Wis.

Figure 6:
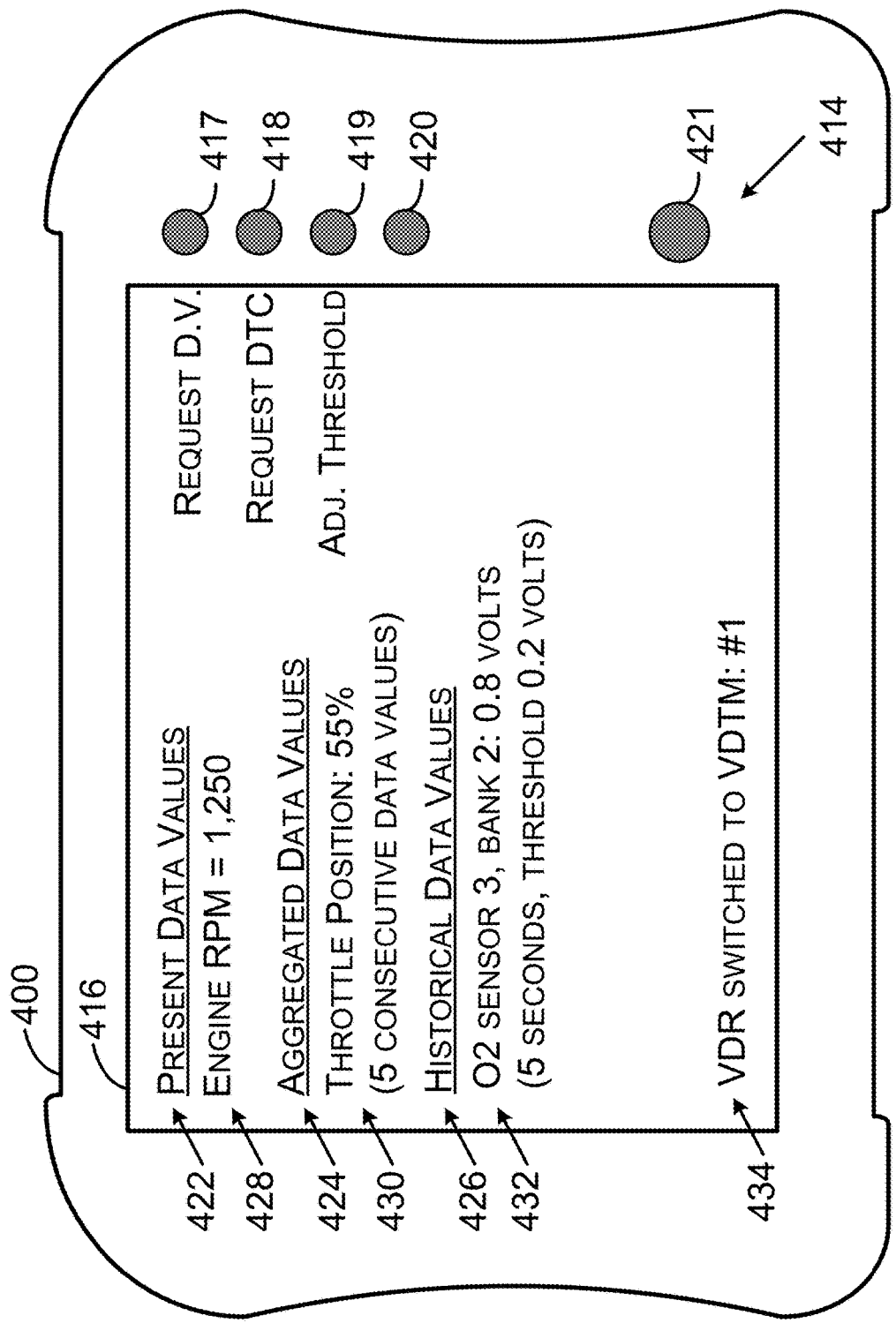
FIG. 6 is a depiction of an example VDR in accordance with the example embodiments.

Next, FIG. 6 is a depiction of the VDR 400 in accordance with the example embodiments. As shown in FIG. 6, the VDR 400 includes the user interface 414, the display 416, and input elements 417, 418, 419, 420, and 421. Those input elements may be reconfigurable based on the content being displayed or to be displayed by the display 416. As an example, the input element 417 may be used to input data for requesting a data value from the vehicle 102. As another example, the input element 418 may be used to request a DTC from the vehicle 102. As another example, the input element 419 may be used to adjust a threshold associated with a VDM data value.

As shown in FIG. 6, the display 416 may display an indicator 422 that indicates which data values displayed by the VDR 400 are present data values, an indicator 424 that indicates which data values displayed by the VDR 400 are aggregated data values, and an indicator 426 that indicates which data valued displayed by the VDR 400 are historical data values. A data value 428 is a present data value indicating engine RPM. A data value 430 is an aggregated data value indicating a throttle position. The display 416 may indicate how many data values the aggregated data value is based on, such as 5 consecutive data values for the data value 430. A display value 432 is a historical data value for an oxygen sensor. The display 416 may display a time (e.g., 5 seconds). The time may indicate when the historical data value was received by the VDR 416 or some other time associated with the data value 432. The display 416 may display a threshold associated with a historical data value. As shown in FIG. 6, a displayed value may include a data identifier (e.g., engine RPM), or a units (e.g., percent or volts) associated with a data value.

The display 416 may display an indicator 434 to indicate that the VID 114 or the VID 200 has changed VDTM or to indicate which VDTM the VID 114 or the VID 200 is presently using.

III. Example Operation

Figure 5:
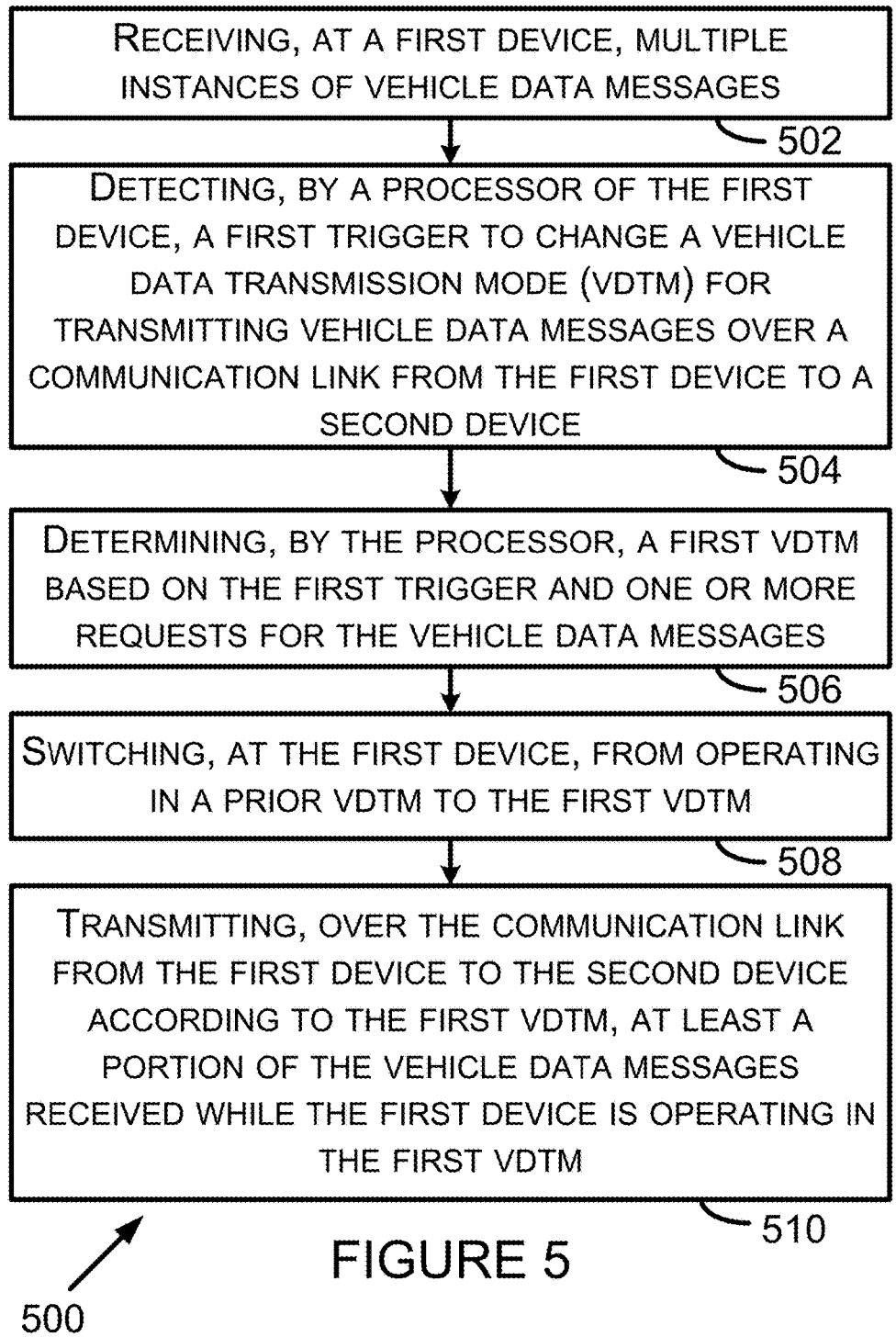
FIG. 5 is a flowchart depicting a set of functions that may be carried out in accordance with one or more example embodiments.

Next, FIG. 5 is a flowchart depicting a set of functions 500 (or more simply "the set 500") that may be carried out in accordance with one or more example embodiments described herein. The set 500 includes the functions shown in blocks labeled with even numbers 502 through 510 inclusive. The following description of the set 500 includes references to elements shown in other figures in this application, but the functions of the set 500 are not limited to be carried out by the referenced elements. A variety of methods may be performed using all of the functions shown in the set 500 or any proper subset of the functions shown in the set 500. Any of those methods may be performed with other functions such as one or more of the other functions described herein.

Block 502 includes receiving, at a first device (e.g., the VID 114), multiple instances of vehicle data messages. Each VDM may include a data identifier and a data value. The data identifier may include one or more data identifiers. The data value may include one or more data values. Each VDM may be generated by an ECU in a vehicle, such as any one of the ECU 104, the ECU 106, and the ECU 108 in the vehicle 102. A VDM received by the VID 114 may be received in response to a request for the VDM that the VID 114 sent to the vehicle 102. That request may be arranged in accordance with a push data acquisition mode or a pull data acquisition mode (both of which are described elsewhere in this description), but the request is not necessarily so limited. Alternatively, a VDM received at the VID 114 may be received in an unsolicited manner in that the VID 114 did not request the VDM. In this alternative arrangement, the VID 114 may eavesdrop on data being communicated on a VCL between multiple ECU within the vehicle 102.

As an example, a VDM may comprise a VDM in accordance with one or more SAE standards, such as an SAE J1979 standard regarding E/E Diagnostic Test Modes and an SAE J1850 standard regarding a Class B Data Communications Network Interface. For instance, a VDM may include a response to a present powertrain diagnostic data request message (e.g., a read PID value message) that includes a service identifier (e.g., [41]), a parameter identifier (e.g., [00] or [01]), and one or more data bytes representing the data value (e.g., a payload of the VDM). For this example, the data identifier may include one or more of the service identifier and the parameter identifier, and the data value may include the payload of the VDM. In some instances, a service identifier in a VDM may equate to a service identifier in a request for a VDM (e.g., [01]) plus a fixed value (e.g., [40]), such that the VDM service identifier is [41]. Other examples of standards for arranging a VDM are also possible.

Figure 7:
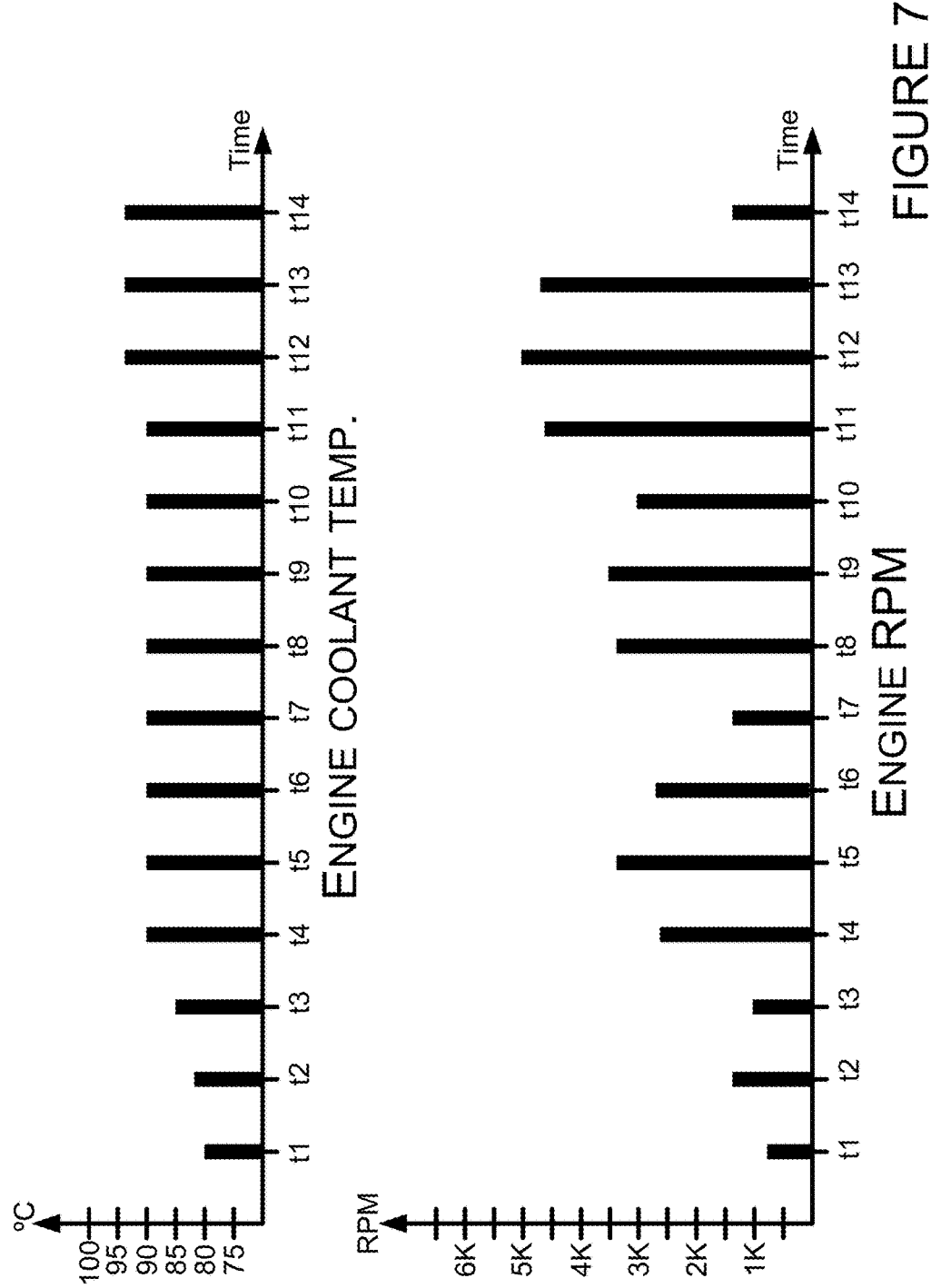
FIG. 7 includes bar graphs showing variability of data values within vehicle data messages.

FIG. 7 shows bar graphs representing data values of VDM having parameter identifiers representing an engine coolant temperature or an engine RPM over time from t1 to t14. The bar graph for the engine coolant temperature shows that the data values for some VDM, at least over the time period t1 to t14, may have less variability with respect to other VDM with the same parameter identifier. The bar graph for engine RPM shows that the data values for some VDM, at least over the time period t1 to t14, may have greater variability with respect to other VDM with the same parameter identifier. A person having ordinary skill in the art will understand that over another given period of time, such as the first three minutes after a vehicle has been started after being turned off for an eight-hour period, the data values representing engine coolant may have more variability than the data values representing the engine RPM if the vehicle runs at a constant idle speed, because the engine coolant temperature will steadily increase during those first three minutes.

In a manner akin to sampling data of an analog signal in accordance with the Nyquist theorem (i.e., using a sampling rate at least twice the highest waveform frequency), the data values of the engine coolant temperature and the engine RPM shown in FIG. 7 show that it may be desirable to sample the data values of different parameter at different rates in order to be able to display an accurate representation of the data values at the display 120. For example, during the time period of t4 to t11, the engine coolant temperature remains steady at 90° C., whereas during that same time period, the engine RPM increases and decreases multiple times. The processor 202 may be programmed with computer-readable experience-based information such that the processor 202 samples the data values of some requested VDM more frequently than the data values of other requested VDM. The experienced-based information may indicate multiple sets of vehicle operating conditions and which VDM should be requested when and at what rate when the processor detects each set of operating conditions is occurring. The experienced-based information may, for example, be arranged in the form of CRPI or other processor logic.

The multiple instances of vehicle data messages may include multiple instances of a VDM having an identical data identifier and no other VDM. Alternatively, the multiple instances of vehicle data messages may include at least two VDM having different data identifiers.

In response to receiving the multiple instances of vehicle data messages, the VID 114 may store at least a portion of one or more of the vehicle data messages in the computer-readable medium 204 as prior VDM data values 228. The prior VDM data values 228 may include metadata associated with each instance of storing at least a portion of a VDM. As an example, the metadata may include data that indicates a vehicle identifier (ID) of a vehicle that transmitted the VDM, an ECU ID that indicates an ECU that generated the VDM, and data that indicates a time, such as a time the VDM is received at the VID 114 or a time the data is stored at the prior VDM data values 228. A stored time may include a calendar date and is not limited to times representing an hour, minute, and seconds of a day, as shown in Table 1. The stored portion(s) of the VDM may be stored in relation to the metadata. Table 1 includes example data that may be stored in the prior VDM data values 228.

TABLE 1

| Vehicle ID | ECU ID | Time | Mode ID | Parameter ID (Bit ID) | Data value(s) |
|---|---|---|---|---|---|
| VIN 1 | PCM | 12:51:38 | [01] | [01] (A7) | 1 (binary) |
| VIN 1 | PCM | 13:07:13 | [01] | [01] (B0, B4) | 1, 0 (binary) |
| VIN 1 | PCM | 13:05:00 | [01] | [05] | [5B] |
| VIN 1 | PCM | 12:55:40 | [01] | [0C] | [12 F0] |
| VIN 1 | PCM | 13:08:04 | [01] | [1A] | [45] |
| VIN 2 | PCM | 10:41:06 | [01] | [11] | [78] |
| VIN 2 | PCM | 10:45:44 | [01] | [2F] | [3A] |

As shown in Table 1, VDM data values 228 stored in the computer-readable medium 204 may include data that identifies a vehicle identifier, such as a vehicle identification number (VIN) associated with a vehicle, or a portion of a VIN. VIN 1 may be associated with vehicle 102. VIN 2 may be associated with another vehicle. An ECU identifier may represent a powertrain control module (PCM) ECU or another type of ECU within a vehicle. An ECU ID may represent a numeric identifier associated with an ECU. The three right-most columns in Table 1 show example mode ID, parameter ID, and data values that may be stored in the prior VDM data values 228. The example data values represent a data value of a parameter that corresponds to the parameter ID in the row including the data value.

The mode ID [01] may indicate present vehicle data. A mode ID [02] may indicate freeze-frame data that existed at the time an ECU detected a fault. Other examples of a mode ID are also possible.

The parameter ID [01] may indicate monitor data. The data values for some parameter ID, such as [01], may be bitwise encoded (as shown in the second and third rows of Table 1). The A7 bit may represent whether a malfunction indicator lamp in vehicle 102 is on or off. The B0 and B4 bits may represent whether a cylinder misfire test for the vehicle 102 is available and incomplete, respectively. The parameter ID [05] may indicate an engine coolant temperature. The parameter ID [0C] may indicate engine revolutions per minute (RPM). The parameter ID [1A] may indicate an oxygen sensor voltage value for oxygen sensor 3, bank 2. The parameter ID [11] may indicate a throttle position. The parameter ID [2F] may indicate a fuel level input. Other examples of a parameter ID are also possible.

Storing one or more data values of a VDM may include storing the data value(s) from the VDM that was most recently transmitted to the VDR 118 from the VID 114. Storing one or more data values of a VDM may also include storing the data value(s) from the VDM most recently received at the VID.

Next, block 504 includes detecting, at a processor 202 of the first device (e.g., the VID 114), a first trigger to change a VDTM for transmitting vehicle data messages over a communication link (e.g., the communication link 116) from the first device to a second device (e.g., the VDR 118). Processor 202 may execute CRPI 222 to make the detection of block 504. Execution of the CRPI 222 may cause the processor 202 to detect the first trigger to change the VDTM for transmitting vehicle data messages. Detecting the first trigger may include detecting one or more detectable triggers (e.g., trigger events), such as one or more of the following example trigger events listed below.

As an example, detecting the first trigger may include the processor 202 determining that the VID 114 is receiving vehicle data messages from the vehicle 102 at a rate that exceeds a rate at which the VID 114 is transmitting the vehicle data messages to the VDR 118. If the VID 114 is presently receiving vehicle data messages from the vehicle 102 at a rate that exceeds the rate at which the VID 114 is transmitting the vehicle data messages to the VDR 118, then detecting the first trigger may include the processor 202 determining that the VID 114 is receiving vehicle data messages from the vehicle 102 at a rate that does not exceed (i.e., less than) a rate at which the VID 114 is transmitting the vehicle data messages to the VDR 118. As an example, the rate(s) referred to in this and other examples may be bits per second, bytes per second, messages per second, or some other rate.

As another example, detecting the first trigger may include the processor 202 determining that the VID 114 has not received an acknowledgement from the VDR 118 for one or more VDM transmitted from the VID 114 to the VDR 118. The lack of receiving an acknowledgment may occur as a result of a distance between the VID 114 and the VDR 118 increasing. If the VID 114 has previously determined it has not received an acknowledgement from the VDR 118 for one or more VDM transmitted from the VID 114 to the VDR 118, then detecting the first trigger may include determining that the VID 114 has received an acknowledgement from the VDR 118 for one or more VDM transmitted from the VID 114 to the VDR 118.

In a first respect, detecting the first trigger to change the VDTM may include receiving, at the first device, a mode selection entered at the first device, or a mode selection entered at the second device and subsequently transmitted to the first device. A manual or automatic mode for the VDR 118 may be selected though use of a user interface (e.g., the user interface 414). As an example, the manual mode may be selected along with one or more inputs, such as a VDM data identifier, a data rate, or a data value threshold. The automatic mode may be selected such that the VID 114 or the VDR 118 select at least one of a VDM data identifier, a data rate or a data value threshold to set parameters at the VID 114 for transmitting VDM to the VDR 118.

In another respect, detecting the first trigger to change the VDTM may include receiving, at the first device (e.g., the VID 114) from the second device (e.g., the VDR 118), data indicating whether a user is looking at a display of the second device. User interface 414 may include a camera for detecting when the user is looking at a display of the user interface 414. If the user is not looking at the display, a VDTM may be selected to send fewer VDM or send VDM less often to the VDR 118. Then, when the user is looking at the display, a VDTM may be selected to send more VDM or send VDM more often to the VDR 118. Use of these VDTM may be beneficial when the VID 114 or the VDR 118 use an electric current from a battery for their operating power as the processing of VDM (e.g., transmitting a request for a VDM or receiving a VDM) may lead to depletion of the battery charge for processing VDM the user will not see.

In yet another respect, detecting the first trigger to change the VDTM may include determining, at the first device, a change in speed of a vehicle that provides the vehicle data messages to the first device. As the speed of the vehicle increases or exceeds a speed threshold, a VDTM may be selected to send fewer VDM so that there are fewer VDM to view via user interface 414 in the event a user of the VDR 118 is driving the vehicle. As the speed of the vehicle decreases or goes below a speed threshold, a VDTM may be selected to send more VDM as compared to the quantity of VDM sent with higher vehicle speeds.

In still yet another respect, detecting the first trigger to change the VDTM may include detecting a change in signal strength of a signal transmitted from the VDR 118. A change in signal strength may allow for or require a change in the data transfer rate between the VID 114 and the VDR 118. For example, detecting an increase in signal strength may allow for increasing the data transfer rate between the VID 114 and the VDR 118, whereas detecting a decrease in signal strength may require decreasing the data transfer rate between the VID 114 and the VDR 118.

Next, block 506 includes determining, at the processor 202, a first vehicle data transmission mode based on the first trigger and one or more requests for vehicle data messages. Multiple examples of making this determination are described below. Two or more of those example determinations may be combined to carry out the determination of block 506.

As an example, the one or more requests for VDM may include at least one of one or more requests for vehicle data messages that the VID 114 receives from the VDR 118. As another example, the one or more requests for VDM may include one or more requests for VDM that the VID 114 transmits to the vehicle 102. The vehicle 102 may transmit the VDM in response to those one or more requests. The one or more requests for VDM may be, but is not required to be, arranged according to a request for a VDM while the VID 114 is operating in a push data acquisition mode or a pull data acquisition mode. The one or more requests for VDM may remain active continually until such time that the VID 114 changes the one or more requests for VDM (e.g., until the VID 114 transmits another one or more requests for VDM). Of course, one or more requests for VDM may cease if an electric current being provided to one or more of the VID 114 and the vehicle 102 is interrupted.

As another example, determining the first VDTM may include determining a threshold for each VDM requested by the VDR 118. Processor 202 may determine the threshold from the thresholds 230 based on a determined data transfer rate. The thresholds 230 may include one or more thresholds that is associated with both a common VDM and a respective data transfer rate. Processor 202 may determine the threshold by modifying (e.g., increasing or decreasing) a threshold used for a particular VDM for a prior VDTM. For instance, if a prior threshold for an oxygen sensor voltage VDM was 0.2 volts and the data transfer rate for transmitting VDM decreases, then the processor 202 may increase the threshold for the oxygen sensor voltage VDM to 0.3 volts or some other voltage value greater than 0.2 volts. In other words, the processor 202 may determine an increased threshold when the data transfer rate for transmitting VDM decreases and determine a decreased threshold when the data transfer rate for transmitting VDM increases.

As another example, determining a VDTM, such as the first VDTM, may include determining a priority associated with a data identifier of a VDM and either adding or removing the VDM including the data identifier to a list of VDM to be transmitted to the VDR 118 while the VID 114 operates in the VDTM. For instance, a VDM including the data identifier may be added to the list in response to determining an increase in the data transfer rate for transmitting VDM or a VDM including the data identifier may be removed from the list in response to determining a decrease in the data transfer rate for transmitting VDM. The VDM added to the list may include a requested VDM having the lowest priority not presently being sent to the VDR 118. The VDM removed from the list may include a requested VDM having the lowest priority presently being sent to the VDR 118.

The respective priority associated with one or more VDM may be based on experienced-based information (EBI). The EBI may indicate which VDM are most pertinent (e.g., having a highest or greater priority) to a symptom being diagnosed or a vehicle part suspected as being faulty as compared to other VDM. The EBI may be stored in the computer-readable medium 204 for use by the processor 202 to determine the respective priority of the VDM identified by the one or more requests for the VDM. Additionally or alternatively, the EBI may be stored in the computer-readable medium 404 for use by the processor 402 to determine the respective priority of the VDM identified by the one or more requests for the VDM. Again, additionally or alternatively, the EBI may be stored in a computer-readable medium within or connected to the network 122. The VID 114 or the VDR 118 may request the EBI from a server within or connected to the network 122 and having access to the EBI. Either one or both of the VID 114 and the VDR 118 may transfer the EBI to the other.

As yet another example, determining a VDTM, such as the first VDTM, may include determining that a VDM including a first data identifier, that is received while the first device is operating in the VDTM, will be transmitted from the VID 114 to the VDR 118 if a difference between (i) the data value of the VDM including the first data identifier that is received while the VID 114 is operating in the VDTM, and (ii) a data value of a VDM including the first data identifier that was most recently transmitted from the VID 114 to the VDR 118, exceeds a threshold value within the thresholds 230. The threshold value is associated with the VDM.

As still yet another example, determining a VDTM, such as the first VDTM, may include determining that the VID 114 will transmit a status message, such as a heartbeat message or a keep-alive message, to the VDR 118. This VDTM may be selected when a data transfer rate for transmitting VDM to the VDR 118 is relatively low as compared to the other VDTM described herein. Sending or receiving the status message or an acknowledgment in response thereto may be carried out to prevent the VID 114 and the VDR 118 from disconnecting a communication link established between those devices, and from having to repeatedly reestablish the communication link if the link were to disconnect as a result of at least one of the VID 114 and the VDR 118 disconnecting from the other based on a determination that the other is no longer near the other.

The first VDTM may be any of the VDTM described herein, or some other VDTM. The prior VDTM may be a VDTM other than the first VDTM. A second VDTM may be a VDTM other than the first VDTM.

Next, block 508 includes switching, at the first device (e.g., the VID 114), from operating in a prior VDTM to the first VDTM. The VID 114 may transmit to the VDR 118 an indication that indicates the VID 114 has switched or is switching from operating in the prior VDTM to the first VDTM, and similarly transmit such indications any other time it switches VDTM. Several examples regarding operating in the prior VDTM and in the first VDTM are listed below. These examples are referred to as example VDTM. Any example VDTM that includes transmitting a VDM may include transmitting the entire VDM or a portion of the VDM. Each VDM transmitted or received in the example embodiments may include a data identifier. For clarity of describing the examples, the data identifier of the VDM discussed in the examples (e.g., a set of VDM) is a first data identifier unless specified otherwise. The first data identifier may include a first identifier value (e.g., [01]) for requesting data or a second identifier value (e.g., [41]) for reporting data. A person skilled in the art will understand that the example VDTM may be carried out for each set of VDM with different data identifiers (e.g., a set of VDM with a second data identifier, a set of VDM with a third data identifier, etcetera) and for multiple sets of VDM.

The prior VDTM referred to in block 508 may include, but is not limited to, any one or more of the example VDTM described herein. Any two or more of the example VDTM may be carried out in combination for the prior VDTM unless doing so would cause conflict. Similarly, the first VDTM referred to in block 508 may include, but is not limited to, any one or more of the other example VDTM described herein. Any two or more of the example VDTM may be carried out in combination for the first VDTM unless doing so would cause conflict.

For first, second, third, fourth, fifth, and sixth example VDTM described hereafter, operating in the prior VDTM may include transmitting, over the communication link 116 from the VID 114 to the VDR 118, a VDM including a data identifier that is received while the VID 114 is operating in the prior VDTM. Similarly, operating in the first VDTM may include transmitting, over the communication link 116 from the VID 114 to the VDR 118, a VDM including a data identifier that is received while the VID 114 is operating in the first VDTM.

In accordance with the first example VDTM, one of the prior VDTM and the first VDTM may be a conditional VDTM in which the VID 114 transmits the VDM only if the data values of the two most-recently-received VDM with the first identifier are different, whereas the other of the prior VDTM and the first VDTM may cause the VDM to be transmitted regardless of whether the data values of the two most-recently-received VDM with the first identifier are the same or different. Switching operation to the conditional VDTM of the first example may be beneficial when a decrease in the data transfer rate has been detected or when the data transfer rate has decreased at a threshold amount. Table 2 illustrates example data showing whether the data value gets transmitted when the VID 114 is operating in the conditional VDTM of the first example VDTM.

TABLE 2

| Engine RPM identifier | Earlier data value | Most recent data value | Most-recent data value gets transmitted for conditional VDTM |
|---|---|---|---|
| [0C] | 4,000 RPM | 4,000 RPM | No |
| [0C] | 4,000 RPM | 3,750 RPM | Yes |

In accordance with the second example VDTM, one of the prior VDTM and the first VDTM may be a conditional VDTM in which a VDM is transmitted to the VDR 118 by the VID 114 only if a data value of the most-recently-received VDM of the two most-recently-received VDM with the same data identifier as compared to the data value of the other most-recently-received VDM has changed by an amount greater than a display value resolution (e.g., 1, 2, or 3 decimal positions (e.g., tenths, hundredths, or thousandths)), whereas the VID 114, for the other of the prior VDTM and the first VDTM, transmits the two most-recently-received VDM regardless of whether a difference of the data values of those two VDM is greater than the display value resolution. The display resolution may pertain to the resolution used to display decimal values on the display 416. Table 3 illustrates example data values of the two most-recently-received VDM with respect to example display resolutions and whether the most-recent data value gets transmitted when the VID 114 is operating in the conditional VDTM of the second example VDTM.

TABLE 3

| O2 sensor voltage data identifier | Display Resolution | Earlier data value | Most recent data value | Most-recent data value gets transmitted for conditional VDTM |
|---|---|---|---|---|
| [14] | Tenths | 1.010 volts | 1.050 | No |
| [14] | Tenths | 1.010 volts | 0.870 | Yes |
| [14] | Hundredths | 1.010 volts | 1.015 | No |
| [14] | Hundredths | 1.010 volts | 1.047 | Yes |

In accordance with the third example VDTM, one of the prior VDTM and the first VDTM may be a conditional VDTM in which a VDM is transmitted to the VDR 118 by the VID 114 only if a data value of the most-recently-received VDM of the two most-recently-received VDM with the same data identifier as compared to the data value of the other most-recently-received VDM has changed by an amount greater than a predetermined data value amount based on prior experience of diagnosing a vehicle. The prior experience may be an experience of one or more diagnosticians or EBI. The computer-readable medium 404 may store a predetermined data value for a data identifier. The computer-readable medium 404 may store different data values (for use as the predetermined data value) for a common data identifier, where the different data values are dependent upon one or more characteristics of a vehicle, such as a make, model, and year of vehicle 102. Table 4 illustrates an example of experience data that may be stored for four different data identifiers and two different vehicles.

TABLE 4

| Data Identifier | Data Identifier Description | Vehicle #1 | Vehicle #2 |
|---|---|---|---|
| [05] | Engine coolant temperature | 2° C. | 4° C. |
| [11] | Throttle position | 1.5% | 3.0% |

TABLE 4-continued

| Data Identifier | Data Identifier Description | Vehicle #1 | Vehicle #2 |
| --- | --- | --- | --- |
| [5C] | Engine oil temperature | 3° C. | 5° C. |
| [5D] | Fuel injection timing | 5° | 8° |

In accordance with the fourth example VDTM, one of the prior VDTM and the first VDTM may be a conditional VDTM in which a VDM is transmitted to the VDR 118 by the VID 114 only if a data value of the most-recently-received VDM of the two most-recently-received VDM with the same data identifier as compared to the data value of the other most-recently-received VDM has changed by an amount greater than a certain percentage (e.g., a proportion) of the data value of the of the other most-recently-received VDM. Two or more of the various data identifiers may be associated with the same or different percentages in regard to the fourth example VDTM. Table 5 shows an example of data values for some example data identifiers in regard to the fourth example VDTM.

TABLE 5

| Data Identifier | Data Identifier Description | Earlier data value | Most recent data value | Percentage change |
| --- | --- | --- | --- | --- |
| [17] | O2 sensor voltage | 0.01 volts | 0.03 volts | 200% |
| [17] | O2 sensor voltage | 1.10 volts | 1.13 volts | 2.7% |

If a threshold percentage associated with the VDM including data identifier [17] is thirty percent (i.e., 30%), then for the conditional VDTM of the fourth example VDTM, the most recent data value of 0.03 volts would be transmitted to the VDR 118 as the percentage change for that data value is 200% and is greater than the threshold percentage. Conversely, the most recent data value of 1.13 volts would not be transmitted for the conditional VDTM of the fourth example VDTM as the percentage change is 2.7% and is less than the threshold percentage. For the other VDTM of the fourth example VDTM, both of the most recent data values would be sent to the VDR 118.

In accordance with the fifth example VDTM, one of the prior VDTM and the first VDTM may be a conditional VDTM in which a VDM is transmitted to the VDR 118 by the VID 114 only if a data value of the most-recently-received VDM is not associated with a data identifier on a list of restricted data identifiers. The list of restricted identifiers may be changed dynamically to add data identifier(s) if the determined the data transfer rate for transmitting VDM has decreased and to remove data identifier(s) if the determined the data transfer rate for transmitting VDM has increased. The various data identifiers may be prioritized so that the processor 202 may determine which data identifier(s) to add back or to remove from the list of data identifiers. The prioritization of data identifiers may be selected based on the experience of one or more diagnosticians or on EBI mined from vehicle service records regarding the servicing of multiple vehicles. The processor 202 may be programmed to make the foregoing determination based on that selected prioritization of data identifiers.

Multiple lists of prioritized data identifiers may be stored in the computer-readable medium 204. One or more of those lists may be associated with a vehicle characteristic or a vehicle symptom such that the processor 202 may select an appropriate list of data identifiers for dynamically changing the list of restricted identifiers based on the VID 200 being connected to a particular vehicle or being used to resolve a particular vehicle symptom.

In accordance with the sixth example VDTM, one of the prior VDTM and the first VDTM may be a conditional VDTM in which a VDM is transmitted to the VDR 118 by the VID 114 only if a threshold time value has passed since the VID 114 last transmitted a data value of a VDM with the same data identifier. The other of the prior VDTM and the first VDTM may include transmitting the VDM to the VDR 118 upon receipt of the VDM. The various data identifiers may be associated with the same or different threshold times. As an example, a data identifier [0C] for engine RPM may have a short threshold time (e.g., 0.3 seconds) and a data identifier [05] for engine coolant temperature may have a long threshold time (e.g., 30.0 seconds), relatively speaking. The processor 202 may dynamically change the threshold times in response to determining an increase or decrease in the data transfer rate for transmitting VDM.

Carrying out the conditional VDTM of the sixth example VDTM may include changing a time interval between occurrences of the VID 114 requesting, from the vehicle 102, a vehicle data message including a particular data identifier. In one case, changing the time interval may include increasing the time interval if the difference between (i) the data value of a most-recently received vehicle data message including the particular data identifier and (ii) a threshold associated with the vehicle data message including the particular data identifier, is less than the difference between (a) the data value of an earlier-received vehicle data message including the particular data identifier and (b) the threshold associated with the vehicle data message including the particular data identifier. In another case, changing the time interval may include decreasing the time interval if the difference between (i) the data value of the most-recently received vehicle data message including the particular data identifier and (ii) the threshold associated with the vehicle data message including the particular data identifier, is greater than the difference between (a) the data value of the earlier-received vehicle data message including the particular data identifier and (b) the threshold associated with the vehicle data message including the particular data identifier.

The processor 202 may switch to one or more the described conditional VDTM of the example VDTM in order to restrict or further restrict transmission of data from the VID 114 to the VDR 118 and to decrease the data transfer rate for transmitting such data. Conversely, the processor 202 may stop using one or more of the described conditional VDTM and switch to one of the other example VDTM in order to transmit more data from the VID 114 to the VDR 118 and to increase the data transfer rate for transmitting such data. The conditional VDTM may be prioritized in the following order from greatest to lowest priority: the first example VDTM, the second example VDTM, the third example VDTM, the fourth example VDTM, the fifth example VDTM, and the sixth example VDTM. Any other permutation of those example VDTM or a proper subset of those example VDTM may be used to prioritize the VDTM.

In one respect, switching from the prior VDTM to the first VDTM may result in increasing a data transfer rate of the VDM. The increased data transfer rate may result in the VID 114 receiving relatively more acknowledgments from the VDR 118 over a given time period as compared to a prior time period of equal or substantially equal time, or receiving a particular amount of acknowledgments over a relatively shorter time period as compared to an amount of time it took to previously receive the same number of acknowledgments from the VDR 118. Also, the increased data transfer rate may allow the VDR 118 to request an increased amount of data, such as (i) an increased number of VDM relative to a number of VDM previously requested by the VDR 118, (ii) transmitting VDM at an increased rate relative to a most-recent request for transmitting VDM at a particular rate, or (iii) VDM that have a larger payload than the VDM previously requested by the VDR 118.

If switching to the first VDTM results in switching to a VDTM with a decreased data transfer rate, then the first VDTM may include a VDTM in which at least some of a set of VDM received during the prior VDTM (or the VDM requested by the active one or more requests for VDM) are not to be transmitted from the VID 114 to the VDR 118. The one or more requests for VDM may be used to determine which VDM belong to the set of presently-received VDM. For example, the determination may be based on an amount of data (e.g., a number of data bits or bytes) that is to be transmitted to the VDR 118 in order to provide the requested VDM. As another example, the determination may be based on how often each request for the requested VDM is being received or a requested interval for providing the requested VDM.

If switching to the first VDTM results in switching to a VDTM with an increased data transfer rate, then the first VDTM may include a VDTM in which VDM in addition to a set of VDM received during the prior VDTM (or the VDM requested by the active one or more requests for VDM) may be transmitted from the VID 114 to the VDR 118. The one or more requests for VDM may be used to determine which VDM belong to the set of received VDM. In a first respect, transmitting the VDM may include transmitting all data values of all the VDM. In a second respect, transmitting the VDM may include transmitting all data values and data identifiers of all the VDM. In a third respect, transmitting the VDM may include transmitting each VDM of all the VDM in its entirety.

In another respect, switching from the prior VDTM to the first VDTM may result in decreasing a data transfer rate of the VDM. The decreased data transfer rate may result in the VID 114 receiving relatively fewer acknowledgments from the VDR 118 over a given time period as compared to a prior time period of equal or substantially equal time, or receiving a particular amount of acknowledgments over a relatively longer time period as compared to an amount of time it took to previously receive the same number of VDR acknowledgments from the VDR 118. Also, the decreased data transfer rate may cause the VDR 118 to request an decreased amount of data, such as (i) an decreased number of VDM relative to a number of VDM previously requested by the VDR 118, (ii) transmitting VDM at an decreased rate relative to a most-recent request for transmitting VDM at a particular rate, or (iii) VDM that have a smaller payload than the VDM previously requested by the VDR 118.

In yet another respect, switching from the prior VDTM to the first VDTM may result in changing the data transfer rate such that an amount of time between the VID 114 transmitting two consecutive VDM to the VDR 118 or an average (i.e., mean) time between the VID 114 transmitting two consecutive VDM to the VDR 118 for a number of VDM exceeding two VDM, for the first VDTM has increased or decreased by at least a threshold amount with respect to the prior VDTM.

In yet another respect, switching from the prior VDTM to the first VDTM may result in changing the VID 114 from transmitting vehicle data messages to the VDR 118 at a data rate that exceeds a threshold data transmission value during the prior VDTM to the VID 114 transmitting vehicle data messages to the VDR 118 at a data rate that does not exceed (i.e., is less than) a threshold data transmission value for the first VDTM.

Moreover, switching from the prior VDTM to the first VDTM may result in the VID 114 switching from transmitting VDM using a first communication protocol to transmitting VDM using a second communication protocol that is different than the first communication protocol. The first communication protocol may be a communication protocol in accordance with one of an IEEE 802.15.1 standard and a 3G cellular phone communication standard and the second communication protocol may be a communication protocol in accordance with the other of those two standards. Other examples of the first and second communication protocols are also possible.

Next, block 510 includes transmitting, over the communication link (e.g., the communication link 116) from the first device (e.g., the VID 114) to the second device (e.g., the VDR 118) according to the first VDTM, at least a portion of the vehicle data messages received while the first device is operating in the first VDTM. Upon receiving the at least a portion of the vehicle data messages, the VDR 118 may display the received portion and transmit an acknowledgment to the VID 114 to confirm that the portion was received at the VDR 118.

As indicated above, other methods may be carried out using one or more of the functions of the set 500 plus one or more other functions. Examples of at least some of the one or more other functions are now described.

Another example function includes determining, by the processor 202, a second change in the data transfer rate for transmitting vehicle data messages over the network from the first device to the second device.

Another example function includes determining, by the processor 202, a second VDTM based on the second change in the data transfer rate and the one or more requests for the vehicle data messages. In accordance with this and the following example, the first VDTM may be any of the example VDTM described herein or some other VDTM and the second VDTM may be any other of the example VDTM described herein or some other VDTM.

Another example function includes switching, by the first device (e.g., the VID 114), from operating in the first VDTM to the second VDTM. The first device may transmit to the second device (e.g., the VDR 118) an indication the first device switched from operating in the first VDTM to the second VDTM.

Another example function includes transmitting, over the network from the first device to the second device according to the second VDTM, at least a portion of the vehicle data messages, received while the first device is operating in the second VDTM.

Another example function includes determining a difference between a prior data value and another data value of a most-recently received vehicle data message including the particular data identifier and determining whether to transmit the other data value to the transceiver of the VDR 118 based on whether the difference exceeds the threshold that is associated with the particular data identifier.

IV. Example Computer-Readable Medium

As indicated above, the computer-readable medium 204 includes CRPI 222.

Accordingly, a computer-readable medium may store program instructions, that when executed by a computing device (e.g., the processor 202), cause a set of functions to be performed. For purposes of this description, the program instructions that perform this set of functions to be performed when executed by the computing device is referred to herein as "the set of example CRPI."

As an example, functions performed by execution of the set of example CRPI by the processor 202 may include: (i) receiving, at a first device (e.g., the VID 114), multiple instances of vehicle data messages, wherein each VDM includes a data identifier and a data value, (ii) determining, by the processor 202 of the first device, a first trigger for transmitting VDM over a communication link from the first device to a second device (e.g., the VDR 118), (iii) determining, by the processor, a first VDTM to cause a change in a data transfer rate of the VDM and one or more requests for the VDM, (iv) switching, by the first device, from operating in a prior VDTM to the first VDTM, and (v) transmitting, over the communication link from the first device to the second device according to the first VDTM, at least a portion of the VDM received while the first device is operating in the first VDTM.

As another example, the set of example CRPI may include all or any proper subset of the functions (i), (ii), (iii), (iv), and (v) listed in the previous paragraph and at least one other function of any of the functions described herein as being performed by the VID 114, the VID 200, or any component of the VID 200.

A person having ordinary skill in the art will understand that the functions of the set 500 may be repeated, for example, in response to receiving additional VDM. When repeating functions, such as the function at block 508, the prior VDTM may be the first VDTM that was switched to in block 508 prior to repeating the function of block 508.

V. Conclusion

Example embodiments have been described above. Those skilled in the art will understand that changes and modifications may be made to the described embodiments without departing from the true scope and spirit of the present invention, which is defined by the claims.

We claim:

1. A method comprising:
receiving, at a first device, multiple vehicle data messages, wherein each of the multiple vehicle data messages includes a data identifier and data value transmitted from a vehicle, and wherein the first device is not a component of the vehicle;
detecting, by a processor of the first device, a first trigger to switch from a prior vehicle data transmission mode (VDTM) to a first VDTM for transmitting in their entirety over a communication link from the first device to a second device at least some of the multiple vehicle data messages, wherein the second device is not a component of the vehicle;
determining, by the processor based on (1) the first trigger, and (2) one or more requests the first device transmits to the vehicle to request vehicle data messages or one or more requests the first device receives from the second device to request vehicle data messages, the first VDTM for transmitting in their entirety over the communication link from the first device to the second device at least some of the multiple vehicle data messages;
switching, in response to detecting the first trigger and determining the first VDTM, the first device from operating in the prior VDTM to the first VDTM, wherein some of the multiple vehicle data messages include vehicle data messages received while the first device is operating in the first VDTM; and
transmitting the vehicle data messages received while the first device is operating in the first VDTM in their entirety over the communication link from the first device to the second device according to the first VDTM.

2. The method of claim 1, further comprising:
detecting, by the processor, a second trigger to switch a VDTM for transmitting vehicle data messages over the communication link from the first device to the second device;
determining, by the processor, a second VDTM based on the second trigger and the (1) one or more requests for the vehicle data messages the first device transmits to the vehicle, or (2) one or more requests for vehicle data messages the first device receives from the second device;
switching, in response to detecting the second trigger, the first device from operating in the first VDTM to the second VDTM, wherein some of the multiple vehicle data messages include vehicle data messages received while the first device is operating in the second VDTM; and
transmitting the vehicle data messages received while the first device is operating in the second VDTM over the communication link from the first device to the second device according to the second VDTM.

3. The method of claim 2,
wherein one of the first VDTM and the second VDTM uses a decreased data transfer rate and another of the first VDTM and the second VDTM includes an increased data transfer rate,
wherein the decreased data transfer rate results in the first device determining at least some data values of a first set of presently-received vehicle data messages are not to be transmitted from the first device to the second device, and
wherein the increased data transfer rate results in the first device determining that all data values of a second set of presently-received vehicle data messages are to be transmitted from the first device to the second device.

4. The method of claim 1, wherein determining the first trigger includes determining the first device is receiving vehicle data messages at a rate that exceeds a rate at which the first device is transmitting at least a portion of the vehicle data messages to the second device.

5. The method of claim 1, wherein determining the first trigger includes determining that the first device is transmitting at least a portion of the vehicle data messages to the second device at a rate that exceeds a threshold data transfer rate.

6. The method of claim 1, wherein switching from operating in the prior VDTM to the first VDTM includes switching from transmitting vehicle data messages using a first communication protocol to transmitting at least a portion of the vehicle data messages using a second communication protocol that is different than the first communication protocol.

7. The method of claim 1, wherein detecting the first trigger to switch from the prior VDTM to the first VDTM includes receiving, by the first device, a manual mode selection entered at the first device or at the second device.

8. The method of claim 1, wherein detecting the first trigger to switch from the prior VDTM to the first VDTM includes receiving, by the first device from the second device, data indicating whether a user is looking at a display of the second device.

9. The method of claim 1, wherein detecting the first trigger to switch from the prior VDTM to the first VDTM includes determining, by the first device, a change in speed of a vehicle that provides the vehicle data messages to the first device.

10. The method of claim 1, wherein determining the first VDTM includes determining that a vehicle data message including a first data identifier, that is received while the first device is operating in the first VDTM, will be transmitted from the first device to the second device if a difference between a data value of the vehicle data message including the first data identifier that is received while the first device is operating in the first VDTM and a data value of a vehicle data message including the first data identifier that was most recently transmitted from the first device to the second device exceeds a threshold value.

11. The method of claim 1,
wherein operating in the prior VDTM includes transmitting, over the communication link from the first device to the second device, a vehicle data message including a first data identifier that is received while the first device is operating in the prior VDTM only if a difference between the data value of the vehicle data message including the first data identifier that is received while the first device is operating in the prior VDTM and a data value of another vehicle data message including the first data identifier that was most recently transmitted from the first device to the second device exceeds a threshold value, and
wherein operating in the first VDTM includes transmitting, over the communication link from the first device to the second device, a vehicle data message including the first data identifier that is received while the first device is operating in the first VDTM regardless of whether or not a difference between the data value of the vehicle data message including the first data identifier that is received while the first device is operating in the first VDTM and a data value of another vehicle data message including the first data identifier that was most recently transmitted from the first device to the second device exceeds a threshold value.

12. The method of claim 1, further comprising:
transmitting, over the communication link from the first device to the second device, an indication the first device switched from operating in the prior VDTM to the first VDTM.

13. The method of claim 1,
wherein the data identifiers of the multiple vehicle data messages include a plurality of different data identifiers, and
wherein determining the first VDTM is further based on a priority associated with each data identifier of the plurality of different data identifiers.

14. The method of claim 13, further comprising:
storing, by a non-transitory computer-readable medium of the first device for each of the plurality of different data identifiers, a data value of each vehicle data message including a different data identifier that was most recently transmitted from the first device to the second device.

15. The method of claim 1,
wherein the first device comprises a vehicle interface device, and wherein the second device comprises a vehicle data receptor including or connected to a display device.

16. The method of claim 1,
wherein switching from operating in the prior VDTM to the first VDTM includes changing a time interval between occurrences of the processor requesting, from a vehicle, a vehicle data message including a particular data identifier,
wherein changing the time interval includes increasing the time interval if a difference between (i) a data value of a most-recently received vehicle data message including the particular data identifier and (ii) a threshold associated with the vehicle data message including the particular data identifier, is less than the difference between (i) a data value of an earlier-received vehicle data message including the particular data identifier and (ii) the threshold associated with the vehicle data message including the particular data identifier, and
wherein changing the time interval includes decreasing the time interval if the difference between (i) the data value of the most-recently received vehicle data message including the particular data identifier and (ii) the threshold associated with the vehicle data message including the particular data identifier, is greater than the difference between (i) the data value of the earlier-received vehicle data message including the particular data identifier and (ii) the threshold associated with the vehicle data message including the particular data identifier.

17. A vehicle interface device comprising:
a service data link connector configured to establish a connection with a vehicle to receive multiple vehicle data messages, wherein each of the multiple vehicle data messages includes a data identifier and data value transmitted from the vehicle, and wherein the vehicle interface device is not a component of the vehicle;
a first transceiver configured to establish a communication link with a second transceiver, wherein the second transceiver is not a component of the vehicle nor of the vehicle interface device;
a processor connected to the service data link connector and to the first transceiver; and
a non-transitory computer-readable medium containing computer-readable program instructions that, when executed by the processor, cause the vehicle interface device to perform a set of functions,
wherein the set of functions includes:
detecting a first trigger to switch from a prior vehicle data transmission mode (VDTM) to a first VDTM for transmitting in their entirety over the communication link to the second transceiver, at least some of the multiple vehicle data messages;
determining, based on (1) the first trigger, and (2) one or more requests the vehicle interface device transmits to the vehicle to request vehicle data messages or one or more requests the vehicle interface device receives from the second transceiver to request vehicle data messages, the first VDTM for transmitting in their entirety over the communication link from the first transceiver to the second transceiver at least some of the multiple vehicle data messages;
switching, in response to detecting the first trigger and determining the first VDTM, operation of the vehicle interface device from the prior VDTM to the first VDTM, wherein some of the multiple vehicle data messages include vehicle data messages received while the vehicle interface device is operating in the first VDTM; and transmitting, from the first transceiver, the vehicle data messages received while the vehicle interface device is operating in the first VDTM in their entirety over the communication link from the vehicle interface device to the second transceiver according to the first VDTM.

18. The vehicle interface device of claim 17, further comprising:
a vehicle data message (VDM) transceiver connected to the service data link connector,
wherein the VDM transceiver is configured to transmit a request for a VDM to the vehicle via the service data link connector.

19. The vehicle interface device of claim 17,
wherein the service data link connector includes a connector configured to connect to a vehicle data link connector in the vehicle, and
wherein the service data link connector is configured to establish at least one of a wired connection to a vehicle via the vehicle data link connector and a wireless connection to the vehicle via the vehicle data link connector.

20. The vehicle interface device of claim 17, further comprising:
a battery or power interface connected to the service data link connector,
wherein the battery or power interface provides an electric current to operate the processor and first transceiver.

21. The vehicle interface device of claim 17,
wherein switching operation of the vehicle interface device from the prior VDTM to the first VDTM includes changing a time interval between occurrences of the vehicle interface device requesting, from the vehicle, a vehicle data message including a particular data identifier,
wherein changing the time interval includes increasing the time interval if a difference between (i) the data value of a most-recently received vehicle data message including the particular data identifier and (ii) a threshold associated with the vehicle data message including the particular data identifier, is less than a difference between (i) the data value of an earlier-received vehicle data message including the particular data identifier and (ii) the threshold associated with the vehicle data message including the particular data identifier, and
wherein changing the time interval includes decreasing the time interval if the difference between (i) a data value of the most-recently received vehicle data message including the particular data identifier and (ii) the threshold associated with the vehicle data message including the particular data identifier, is greater than the difference between (i) a data value of the earlier-received vehicle data message including the particular data identifier and (ii) the threshold associated with the vehicle data message including the particular data identifier.

22. The vehicle interface device of claim 17,
wherein the non-transitory computer-readable medium contains a threshold associated with a particular data identifier receivable in vehicle data messages from the vehicle,
wherein the non-transitory computer-readable medium contains a prior data value associated with a particular data identifier most-recently transmitted from the first transceiver to the second transceiver, and wherein the set of functions further includes:
determining a difference between the prior data value and a data value of a most-recently received vehicle data message including the particular data identifier, and
determining whether to transmit the data value of the most-recently received vehicle data message to the second transceiver based on whether the difference exceeds the threshold.

23. The vehicle interface device of claim 17, wherein detecting the first trigger includes: (i) receiving a manual mode selection entered at a user interface of the vehicle interface device or from the second transceiver, (ii) receiving data indicating whether a user is looking at a display associated with the second transceiver, or (iii) determining a change in a speed of the vehicle.

24. The vehicle interface device of claim 17,
wherein the first transceiver comprises a first wireless transceiver, and
wherein the second transceiver comprises a second wireless transceiver.

25. A vehicle interface device comprising:
a service data link connector configured to establish a connection with a vehicle to receive multiple vehicle data messages, wherein each of the multiple vehicle data messages includes a data identifier and data value transmitted from the vehicle, and wherein the vehicle interface device is not a component of the vehicle;
a first transceiver configured to establish a communication link with a second transceiver, wherein the second transceiver is not a component of the vehicle nor of the vehicle interface device; and
a processor connected to the service data link connector and to the first transceiver, wherein the processor is programmed to:
(i) detect a first trigger to switch from a prior vehicle data transmission mode (VDTM) to a first VDTM for transmitting in their entirety over the communication link to the second transceiver, at least some of the multiple vehicle data messages;
(ii) determine, based on (1) the first trigger, and (2) one or more requests the vehicle interface device transmits to the vehicle to request vehicle data messages or one or more requests the vehicle interface device receives from the second transceiver to request vehicle data messages, the first VDTM for transmitting in their entirety over the communication link from a first device to a second device at least some of the multiple vehicle data messages;
(iii) switch, in response to detecting the first trigger and determining the first VDTM, the vehicle interface device from operating in the prior VDTM to the first VDTM wherein some of the multiple vehicle data messages include vehicle data messages received while the vehicle interface device operates in the first VDTM; and
(iv) provide the first transceiver with the vehicle data messages received while the vehicle interface device operates in the first VDTM for transmission of the vehicle data messages received while the vehicle interface device operates in the first VDTM to the second transceiver in their entirety over the communication link from the first transceiver to the second transceiver according to the first VDTM.

26. The method of claim 1, wherein the data identifier and data value transmitted from the vehicle for at least one vehicle data message includes a data identifier and data value of a vehicle data message transmitted by an electronic control unit in the vehicle.

27. The vehicle interface device of claim 17, wherein the data identifier and data value transmitted from the vehicle for at least one vehicle data message includes a data identifier and data value of a vehicle data message transmitted by an electronic control unit in the vehicle.

* * * * *